US005925843A

United States Patent [19]

Miller et al.

[11] Patent Number: 5,925,843

[45] Date of Patent: Jul. 20, 1999

[54] SONG IDENTIFICATION AND SYNCHRONIZATION

[75] Inventors: Allan A. Miller, Hollis; Vernon A. Miller, Concord, both of N.H.; John H. Paquette, Stoneham, Mass.

[73] Assignee: Virtual Music Entertainment, Inc., Andover, Mass.

[21] Appl. No.: 08/800,221

[22] Filed: Feb. 12, 1997

[51] Int. Cl.[6] .............................. G09B 15/02; G10H 3/06

[52] U.S. Cl. ............................ 84/609; 84/639; 84/477 R

[58] Field of Search ..................... 84/609–614, 634–640, 84/477 R, 478, 115, 462

[56] References Cited

U.S. PATENT DOCUMENTS

| | | | |
|---|---|---|---|
| 4,429,609 | 2/1984 | Warrender | 84/477 R X |
| 4,993,306 | 2/1991 | Veta et al. | 84/634 X |
| 5,085,116 | 2/1992 | Nakata et al. | 84/609 |
| 5,099,738 | 3/1992 | Hotz | 84/617 |
| 5,138,925 | 8/1992 | Koguchi et al. | 84/609 |
| 5,189,237 | 2/1993 | Koguchi | 84/609 |
| 5,313,011 | 5/1994 | Koguchi | 84/609 |
| 5,391,828 | 2/1995 | Tajima | 84/610 X |
| 5,491,297 | 2/1996 | Johnson et al. | 84/609 |
| 5,502,274 | 3/1996 | Hotz | 84/613 |
| 5,602,356 | 2/1997 | Mohrbacher | 84/609 |
| 5,656,789 | 8/1997 | Nakada et al. | 84/477 R |
| 5,726,372 | 3/1998 | Eventoff et al. | 84/609 |

OTHER PUBLICATIONS

Hotz Trax CD manual, p. 14 and help file, 1988–1996.

Ziemer, R.E. et al., "Principles of Communications, Systems, Modulations, and Noise," pp. 224–231, 1978 Houghton Mifflin Company.

*Primary Examiner*—Stanley J. Witkowski

*Attorney, Agent, or Firm*—Fish & Richardson P.C.

[57] ABSTRACT

A computer program for an interactive computer music game is stored on a medium that can be read by a general purpose computer. When read and executed, the program causes the computer to perform functions, including associating a music track on a user compact disc (CD) inserted in the computer's CD-ROM drive with a selected song associated with a music track on a reference CD, and synchronizing music data stored by the computer to the music track on the user CD, where the music data has been derived from the music track on the reference CD associated with the selected song. The program generates user-CD data characteristic of the digital data on the user-CD track, and compares the user-CD data with reference-CD data characteristic of the digital data on the reference-CD track. Based upon the comparison, the computer generates a synchronization function characteristic of timing differences between the reference-CD track and the user-CD track, and adjusts the timing of the music data with the synchronization function. The comparison can include determining a correlation function between the sets of data.

44 Claims, 15 Drawing Sheets

```
204 ;We assume that NumFrames contains the number of frames for the track.
206 ;The "&" operator represents the bitwise AND function.

200 declare array Ketstring of type CHARACTER with 3 elements
202 declare variable NumFrames of type LARGE INTERGER

208 set KeyString[1] = (NumFrames & 63) + 63
210 set NumFrames = NumFrames/64
212 set KeyString[2] = (NumFrames & 63) + 63
214 set NumFrames = NumFrames/64
216 set KeyString[3] = (NumFrames & 63) + 63
```

FIG. 4

151 Find "shift" $\in$ [0, TOTAL_SHIFT] that maximizes:

149 $$\text{Corrfact[shift]} = \sum_{\text{sample}=1}^{\text{sample=SLICE\_SIZE}} \text{RefSlice[sample]} * \text{UserSlice[sample + shift]}$$

```
153 SLICE SIZE = 44100   ;Number of samples per slice (1 second)
155 SHIFT SIZE = 1       ;Number of samples to shift after failed comparison
157 TOTAL SHIFTS = 176399    ;Number of times we can shift.

159 declare array "RefSlice" or type SAMPLE with 44100 elements
161 declare array "UserSlice" of type SAMPLE with (44100 * 5) elements
163 declare variable "Success" of type YESNO with starting value of NO
165 declare variable "Shift" of type INTEGER with starting value of 0
167 declare variable "Count" of type INTEGER
169 declare variable  "CorrFact" of type SIGNED LARGE INTEGER
171 declare variable "BestFact" of type SIGNED LARGE INTEGER with starting value
        of 0
173 declare variable "BestTime" of type INTEGER
```

FIG. 9A

```
175 start loop 1 using Count as counter from 1 to TOTAL_SHIFTS
 177    set CorrFact = 0;

 179    start loop 2 using Sample as counter from 1 to SLICE_SIZE
            set CorrFact = Corrfact + (RefSlice[Sample] *
                UserSlice[Sample+Shift])
        end loop 2

 181    if CorrFact 〉 BestFact then
 183        set BestFact = CorrFact
 185        set BestShift = Shift
        end if

 187    set Shift = Shift + SHIFT_SIZE
189 end loop 1

191 if BestFact > THRESHOLD then
 193    set TimeOffset = (22050 - BestShift) * 0.0000227 ;Convert from Shift to
            seconds
 195    set Success = YES
    else
 197    set Success = No          ;No correlation found, sorry!
    end if
```

FIG.9B

SONG IDENTIFICATION AND SYNCHRONIZATION

BACKGROUND OF THE INVENTION

The invention relates to a method of identifying a selected music track on a compact disk, and synchronizing music data stored in a computer memory to the identified track.

Audio information is recorded on an audio compact disk (CD) as digital data. Data representing different audio passages, such as songs, are recorded on sequential music tracks. Two copies of a given CD, which to all outward appearances are identical, may in fact not contain exactly the same data. A given music track on a CD may not be the same as a corresponding music track on the supposedly identical CD. The difference is related to the manner in which audio CDs are produced, which is fundamentally different from the method by which other types of digital data are recorded on CDs, such as, for example, computer software recorded on CD-ROMs.

To produce, for example, a software title on a CD-ROM, the developer first makes one or more "golden master" CDs, which are made in exactly the same way, using the same data, and are thus identical. The golden masters are sent to one or more CD production facilities. The production facilities make exact copies of the golden masters and use them as masters to produce the final CD-ROM. Nothing in the entire production process, from golden master to final product, changes any of the data, so each CD-ROM is an exact copy of the original golden master used to make it.

By contrast, most popular music is first recorded on multi-track analog tape machines. The multi-track analog master is mixed down to a two-track stereo tape, which may be analog or digital. Eventually, two-track digital master tapes are made, which, due to the large production volumes required for popular CDs, are sent simultaneously to several CD mastering facilities. As part of another transfer process a recording engineer at each mastering facility adds subcode data, which specify the start and end point of each CD track. The digital master tape with audio data and subcode data is used to make a disk master, which is then used to produce the CD.

There is no standard that governs when one track ends and the next one starts. The recording engineer uses his or her judgment to make that determination when adding the subcodes. For example, one engineer might place the "start of song" subcode 100 msec before the beginning of a track, while a different engineer might place the start of song subcode 300 msec before the track begins. Therefore, it is almost certain that the track timings of CDs produced at different facilities will be different.

A second type of timing variation between ostensibly the same music track on different CDs is caused by remastering. Improvements in digital recording and processing have made it possible to produce better-sounding CDs from the original analog masters, and so popular CDs are often re-released using new masters. Sometimes a sticker on the CD package will identify a newly remastered title, but usually there is no change in packaging. And, whenever a new digital master is made from analog sources, variations can be expected. For example, the playback speed of different analog tapes will probably be slightly different, which will cause one or more tracks to be "compressed" or "stretched" in time compared with the original master. This phenomenon we call "time warping."Foreign releases of some CDs can vary even more than their domestic versions. Record companies sometime send analog master tapes to their overseas manufacturers instead of the more accurate digital master. Thus, foreign release CDs may be subject to both time warping (because the analog master tapes will be played back on different machines) and subcode shift (because their own recording engineers will be adding the subcodes).

In extreme cases, a re-released CD may be substantially different from the original. The tracks may have been edited to clean up audio glitches, bonus tracks may be added in between tracks from the original release, or the running order of tracks may be changed. Also, variations may occur between copies of the same title on different labels when a recording artist changes label affiliation and reassigns the back catalog, or between the conventional and high-end versions of a CD title, such as, for example, gold discs produced by Mobile Fidelity and DCC.

In everyday use, timing variations, such as subcode shift, between one CD and another is not a problem because the subcodes are only used to provide the track number and an elapsed time display on the CD player and to program the order of song play on the CD player. However, a subcode shift can present problems in other uses. An interactive computer music game, such as "Quest For Fame Featuring AEROSMITH," produced by Virtual Music Entertainment, Inc. of Andover, Mass., requires synchronization of the audio playback of two different music tracks. The first track is a music track, or music score, taken from a recording, such as, for example, a music track taken from a CD-ROM. The second track is digital music data stored in a music data file in computer memory (music data). The music data represents a score consisting of a series of notes or chords. Each note or chord is associated with a time that corresponds with a selected time in the musical track. After selecting a music track, the user "plays along" with the audio playback of the music track by actuating an input device, such as, for example, a virtual music instrument. When actuated, the input device sends a signal to the computer, which responds by playing the appropriate note or chord from the music data. The computer knows which note or chord to play at a particular time because the music data is synchronized with the playback of the music track. U.S. Pat. No. 5,491,297, to Johnson et al., incorporated herein by reference, describes such a system in greater detail. Synchronizing the music track with the music data is simple where the music data file is derived from a particular CD music track that is also stored in the computer and played back from the computer.

If a user could use their own audio CD collection to provide music tracks for game play, more space would be available on the game disk for additional music data files. However, timing variations can arise where the user plays back the music track from his or her own CD collection, rather than from a CD music track stored in the computer.

Synchronizing music data with a music track on a user CD requires knowing the exact length of time between the start of song subcode marker on the user CD and the actual start of the music track. A subcode shift of even a few milliseconds can be crucial. If the music data stored in computer memory was derived from a reference CD that was produced differently from the user CD in the CD player, the tracks will not be synchronized.

Time warping, like subcode shifting, can make synchronizing audio tracks digitally recorded on different media difficult. Music data in computer memory that is timed and synchronized with the original master release will not synchronize correctly with a new release of the music track that is running faster or slower than the original. At the start of a track everything will be synchronized, but as the music progresses the two recordings will get more and more out of sync.

One solution would be to include in the game program a music data track corresponding to each differently produced version of a CD. However, differently produced or remastered disks are usually indistinguishable from one another. It is impossible to tell who manufactured the disk by looking at the part number or anything on the cover. A remastered re-release usually looks identical to the original release. And, even if it were possible to tell these disks apart, it would be logistically difficult for a game producer to support them all. The cost in time and manpower required to track all of the original differences and re-releases, obtain all of the different CDs, and resynchronize the data, would be prohibitive.

When playing an audio CD, most personal computer CD-ROM drives can be controlled by a programming interface that provides only three relevant pieces of information about the CD in the player: the total number of tracks, the length of each track, and how far into the track you are at any given time while you are playing a CD. "CD player" programs that run on a Macintosh®, Microsoft Windows or MS/DOS type system get the information for their displays in this way. The information comes from the subcodes on the CD. If all CDs of a given title were the same, the subcodes would provide sufficient information to allow programmers to synchronize music data stored in computer memory with a CD music track, but the disc-to-disc variations described above make this impossible.

One approach is to provide settings that can be set manually to compensate for offsets in the songs on audio CDs. It can be difficult to manually adjust for complicated timing variations, and improperly adjusting the settings can make timing problems worse.

SUMMARY OF THE INVENTION

The invention provides a method of matching music data stored in computer memory to data on a music track on a user CD. The method first identifies which music track on the user CD includes data corresponding to a song also represented by the music data. By analyzing the subcodes on the user CD, and cross-correlating data samples from the identified track on the user CD, the method determines how the subcode timings on the user CD have been shifted from reference points, and how much the track has been compressed or expanded in time. Using this information, the stored music data is dynamically resynchronized with the identified track on the user CD recording.

Accordingly, the invention provides a computer program that is stored on a media readable by a general purpose computer. The program configures the computer upon being read and executed to perform functions. These functions include determining which of a plurality of music tracks on a user compact disk (CD) includes digital data representing a selected song, where the selected song is also represented by digital data on a reference-CD track on a reference CD, and the user CD is inserted in a CD-ROM drive of the general purpose computer. In determining, the computer identifies a user-CD track on the user CD most likely to include data representing the selected song. The computer cross-correlates data representative of the user-CD track with data representative of the reference-CD track to produce cross-correlation data. The cross-correlation data has values that are each characteristic of a degree of correspondence between the user-CD track and the reference-CD track for an associated timing offset between the user-CD track and the reference-CD track. The computer determines a maximum value of the cross-correlation data, and associates the user-CD track with the selected song if the maximum value exceeds a threshold value.

The invention also provides a computer program that is stored on media readable by a general purpose computer configured with a CD-ROM drive, for configuring the computer upon being read and executed to synchronize music data being stored on media readable by the computer with a user-CD track on a user compact disk (user-CD) inserted in the CD-ROM drive. The user-CD track includes digital data representing a selected song, wherein the selected song is also represented by digital data on a reference-CD track on a reference CD. The music data is representative of notes based upon the reference-CD track. The programmed computer generates user-CD data characteristic of the digital data on the user-CD track. The computer compares the user-CD data with reference-CD data characteristic of the digital data on the reference-CD track. Based upon the comparison, the computer generates a synchronization function characteristic of timing differences between the reference-CD track and the user-CD track, and adjusts the timing of the music data with the synchronization function.

According to another aspect of the invention, a computer program stored on media readable by a general purpose computer configured with a CD-ROM drive, configures the computer upon being read and executed to perform functions. The functions include synchronizing music data that is stored on media readable by the computer with a user-CD track on a user-CD inserted in the CD-ROM drive. The user-CD track includes digital data representing a selected song. The selected song is also represented by digital data on a reference-CD track on a reference CD. The music data is representative of notes based upon the reference-CD track. The programmed computer generates user-CD data characteristic of a start-song time of each music track on the user CD. The computer compares the user-CD data with reference-CD data characteristic of a start-song time of each music track on the reference-CD. Based upon the comparison, the computer generates a synchronization function characteristic of timing differences between the start-song times on the reference-CD and the user-CD track, and adjusts the timing of the music data with the synchronization function.

According to yet another aspect of the invention, a computer program is stored on media readable by a general purpose computer that is configured with a processor, a memory, a CD-ROM drive that produces an audio signal based on an audio track on a CD, and a sound card that digitizes the audio signal. The sound card includes driver software that stores the digitized audio signal in the memory and delivers the stored signal to the processor. The computer program configures the computer upon being read and executed to determine a digitizing delay indicative of an elapsed time for the sound card to deliver the stored signal in response to the audio signal. The program further configures the computer to synchronize music data being stored on media readable by the computer with a user-CD track on a user-CD compact disk (CD) inserted in the CD-ROM drive based upon the digitizing delay. The user-CD track includes digital data representing a selected song, the selected song also being represented by digital data on a reference-CD track on a reference CD. The music data is representative of notes based upon the reference-CD track.

According to yet another aspect of the invention, a method of synchronizing music data with signals input by a user in response to prompts associated with the music data, includes determining a position of a peak in a distribution of timing differences between the signals input by the user and music data associated with the prompts, and shifting the timing of the music data if the peak position is nonzero. The shifting can include shifting by a fraction of the peak position. The determining and shifting are repeated until the peak position is within a preset timing difference.

The invention thus provides a reliable method of automatically identifying a music track on a user CD corresponding to a selected song, and adjusting the timing of music data also corresponding to the selected song to be synchronized with the identified music track. The timing adjustment compensates for start-song subcode shifts and time warp differences between the user CD and a reference CD from which the music data is derived.

With use of the invention, an interactive computer music game can take advantage of the user's audio CD library for music tracks during game play. Much smaller amounts of audio data than previously required need to be included in the game disc. Thus, more game titles can be included in each disc. New game titles can be downloaded easily from another computer system, such as from the Internet, because less data needs to be transferred than otherwise would be required.

BRIEF DESCRIPTION OF THE DRAWING

FIG. 4 shows a pseudocode representation of a program routine for determining key strings.

FIGS. 9A and 9B show a pseudocode representation of a program routine for performing a cross-correlation using the mathematical function illustrated in FIG. 7.

DESCRIPTION OF THE PREFERRED EMBODIMENTS

Figure 1:
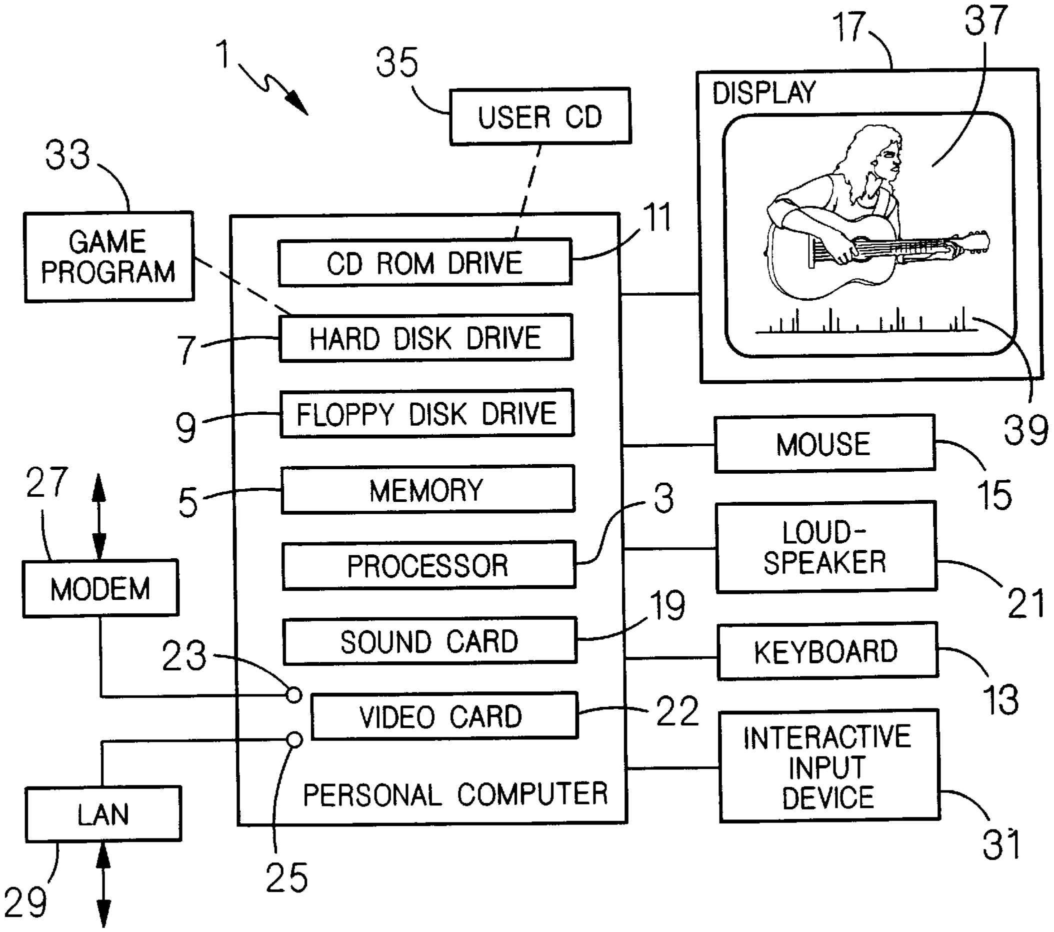
FIG. 1 is a functional block diagram illustrating a computer system configured to run an interactive music game program according to the invention.

Referring to FIG. 1, a general purpose computer, such as, for example, personal computer 1, is configured with a processor 3, memory 5, a hard disk drive 7, a floppy disk drive 9, a CD ROM drive 11, input devices, such as a keyboard 13 and a mouse 15, a display 17, a sound card 19, one or more audio loudspeakers 21, and a video card 22. Personal computer 1 can also be configured with communication ports 23, 25 for communicating with other computer systems or networks (not shown) via, for example, a modem 27 or a LAN 29. An interactive input device 31, which produces control signals when actuated, is also coupled to the computer 1. In its simplest form, interactive input device 31 is a switch. A similar type of computer system arrangement is described in detail in co-owned U.S. Pat. No. 5,491,297, incorporated herein.

An interactive music game program 33 is loaded into the computer's hard disk drive 7 from, for example, a floppy disk, a CD-ROM disk or any other computer readable medium. A game player, or user, can also download game program 33 onto the computer's hard disk drive 7 from another computer system, such as the internet, via communication ports 23, 25. When computer 1 is configured with game program 33, the user can play notes along with music being played back from a user CD 35 in the computer's CD-ROM drive 11, even if the user does not know how to play a musical instrument. When the user actuates the interactive input device 31, the interactive input device 31 sends control signals to the computer. In response, the computer 1 generates audible notes through the computer's sound system 19, 21. The musical notes generated by the computer are represented by music data in a music data file stored in a data base portion of the game program 33.

As will be described in greater detail below, the game program 31, when loaded and executed by computer 1, identifies one of the music tracks on the user CD 35 with a selected song, and synchronizes the music data with the identified music track on the user CD 35. Then, when the user actuates the interactive input device 31 at appropriate times during game play, the computer 1 plays appropriate notes from the music data in sync with the musical score being played from the identified music track on the user CD 35. The programmed computer 1 can also provide an animated video display 37 on display 17 that is interleaved with the music data and in sync with the music from the user CD 35. The computer also provides visible prompts 39 on the display, synchronized with the music from the user CD 35, for the user to actuate the interactive input device 31 at appropriate times.

Figure 2:
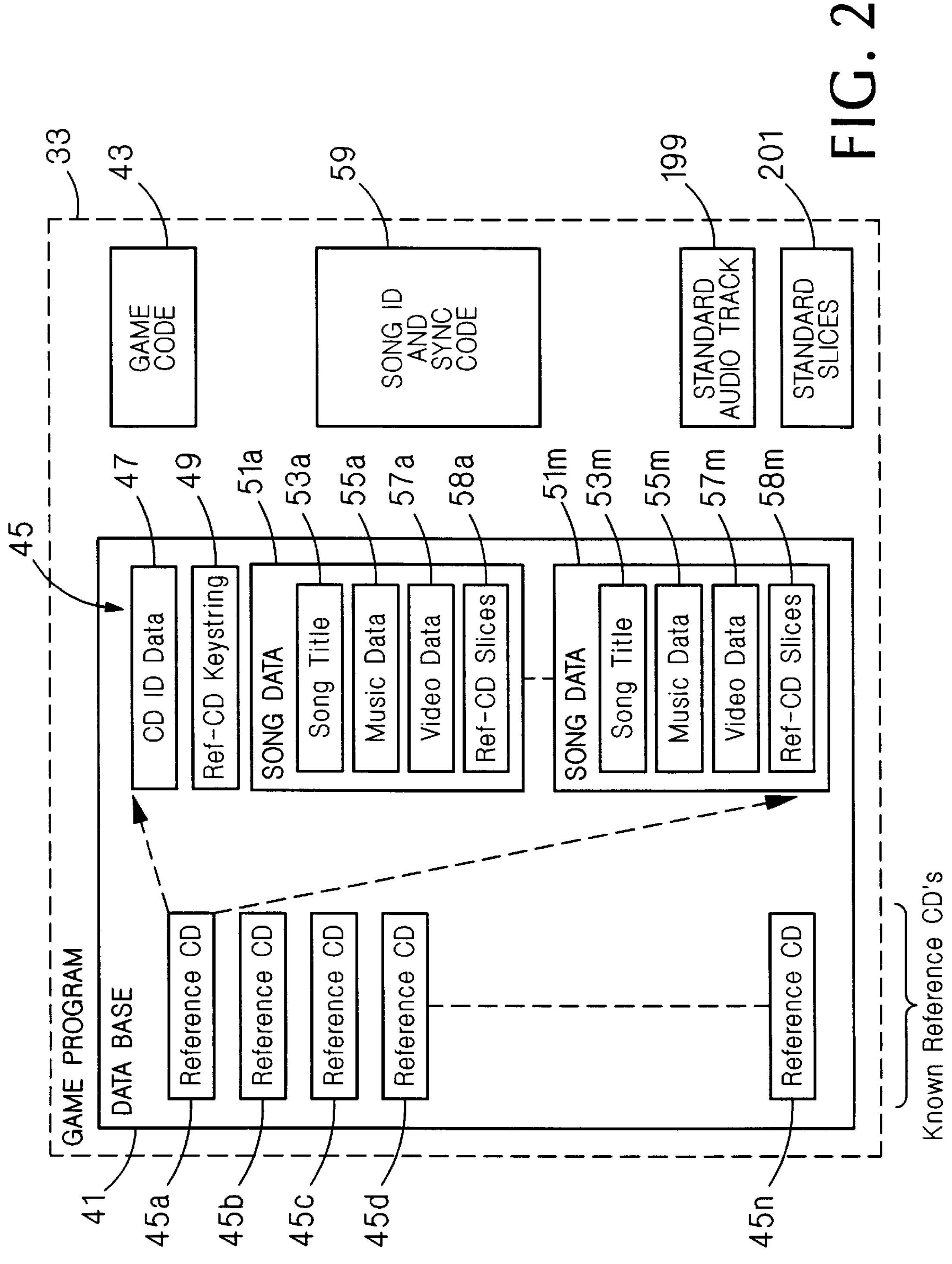
FIG. 2 illustrates portions of an interactive game program according to the invention.

Referring now also to FIG. 2, game program 33 includes a data base 41 and game code 43 for operating the interactive music game on the computer 1. Data base 41 includes a table of "known reference CD" data 45*a*–45*n* (generally referred to as "reference-CD data 45") that the game program 33 can access. A reference CD (not shown) is a CD from which one or more music tracks (reference-CD tracks) are used to develop corresponding tracks of music data. The reference-CD tracks include data representing musical scores, which may or may not include lyrics. A music data track includes data used to produce musical notes corresponding to notes to be played along with the musical score from a corresponding music track on the user CD 35. For example, music data may include data for producing a lead guitar line.

Each reference-CD data 45 includes data that identifies the title of the reference CD and the artist (CD ID data 47). Associated with the CD ID data 47 is a reference-CD (ref-CD) keystring 49, which characterizes the length of each music track on the reference CD. Keystrings will be described in greater detail below. Also associated with each reference-CD data 45 are groups of song data 51*a*–51*m*, generally referred to by reference numeral 51. Each song data 51 includes a song title 53, music data 55 which contains data for producing a musical score based upon the corresponding reference-CD track on the reference CD, and video data 57 for providing the animated display 37 and visual prompts 39 that accompany the playback of the corresponding music track from the user CD 35. Each song data 51 also includes Ref-CD slices 58, which are sections, or "slices" of data from the reference CD, as will be discussed in greater detail below.

The user CD 35 is a CD that the user provides. In theory, a user CD 35 and a reference CD of the same title and the same artist should be identical, but in practice they often are not. As discussed above in the background section, the reference CD and user CD can be different due to a variety of production differences. For example, the subcodes on the user CD 35 may be shifted from the subcodes in the reference CD, the user CD 35 may be time warped with respect to the reference CD, the user CD 35 may have a different number of tracks than the reference CD, or a combination of any of these differences. Such differences create problems in identifying a music track on the user CD 35 that corresponds with a selected song (user-CD track), and in synchronizing the music data for the selected song with the user-CD track. To compensate for the differences between the user CD and the reference CD, game program 33 includes song ID and sync code 59.

Figure 3A:
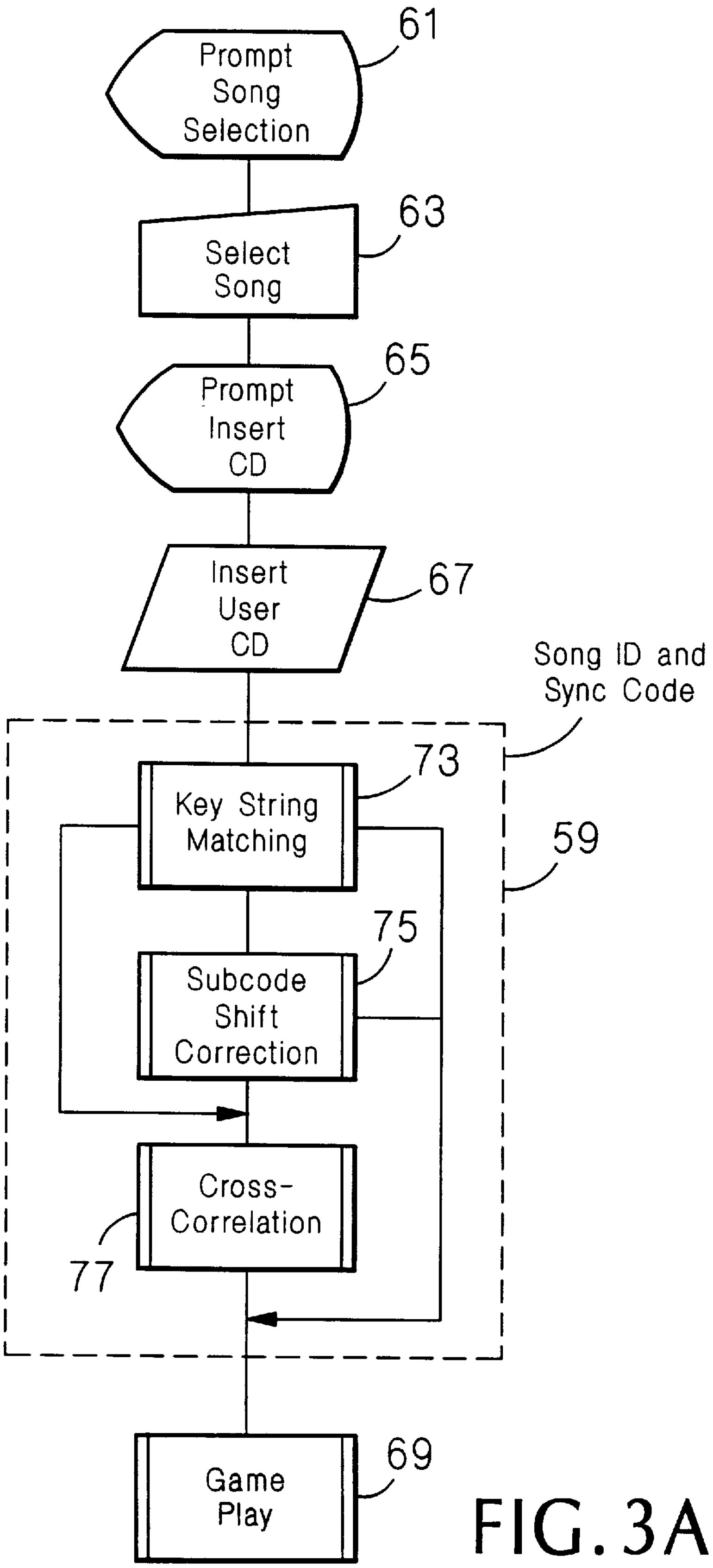
FIGS. 3A–3E are flow charts descriptive of the game program.

Referring now to the flow chart illustrated in FIG. 3A, game program 33, when loaded in the computer 1 and executed, causes the computer 1 to first provide a graphical user interface on the display 17 which prompts the user to identify a selected song title, e.g. 53*a,* from a list of reference songs. This step is indicated at prompt song selection 61 in FIG. 3A. After the user chooses the selected song title 53*a* from the list (select song 63), the computer then prompts the user to insert a user CD (prompt insert CD 65) with the same title and artist as a reference CD which includes the selected song title 53*a* as one of its music tracks. After the user inserts the user CD 35 into the computer's CD ROM drive 11 (insert user CD 67), the computer 1 then executes song ID and sync code 59.

When executed, song ID and sync code 59 determines whether the user CD 35 contains a user-CD track corresponding to a reference-CD track of the selected song title 53*a*, and, if so, quantitatively determines how it differs from the reference-CD track in terms of subcode shift and time warping. The music data track 55*a* associated with the selected song title 53*a* in data base 41 is adjusted, if necessary, to compensate for the determined differences, thereby allowing the notes being played from music data 55*a* to be synchronized with the music being played back from the user CD 35 during game play (69). The song identifying and synchronizing process includes three interrelated parts: keystring matching 73; subcode shift correcting 75; and cross-correlating 77 of data for both subcode shift correction and unwarping.

Key String Matching

The information about a CD for keystring matching 73 is contained in a data structure called a keystring, which is generated for each user CD. The keystring represents the length of each track on the CD as measured between the start song subcodes. Each second of audio CD digital data contains 44,100 samples, or data values, and each sample is 32 bits (4 bytes) long. A single datum represents the value of an audio signal at a discrete point in time. "Frames," which are 13.3 millisecond units of data (75 frames/sec), are a standard unit of measurement for audio CD data.

A keystring, in the described embodiment, is a concatenated series of 3-character groups, each group encoding the length of a track on the CD in frames. The number of 3-character groups in the key string is therefore the number of tracks on the CD. Each character group is a base-64 number, using the sequential ASCII characters from "?" (ASCII value 63) to "~" (ASCII value 126) as digits. This system can encode values from 0 to 262,143 frames in three characters. 262,143 frames represents a little more than fifty-eight minutes, fifteen seconds of playing time. This is much greater than the track length of a single song of popular music, which is the intended application. Greater resolution can be achieved, if needed, by using additional characters in the keystring.

Referring now also to FIG. 4, pseudo-code for an algorithm that generates each three-character group in a keystring is illustrated. The keystring is put into a character array "KeyString" with three elements (line 200). Variable "NumFrames" is defined to be a large integer (line 202) that initially contains the number of frames for the track (line 204). The first (smallest) character of KeyString is determined by taking the bitwise AND function between NumFrames and 63, and adding 63 to the sum (lines 206, 208). NumFrames is then reset to NumFrames divided by 64 (line 210). The second character of KeyString is then set equal to the result of the bitwise AND function between NumFrames and 63, plus 63 (line 212). NumFrames is again reset (line 214) and the final, largest character of KeyString is calculated in a manner similar to the first two characters (line 216).

For example, if a CD contained the following times for three tracks:

Track 1: 2.32;

Track 2: 0:18; and

Track 3: 13:27, then the number of frames in each track would be as follows:

2:32 is 11,140 frames (152 s×75 f/s);

0:18 is 1,350 frames (18 s×75 f/s);

13:27 is 60,525 frames (807 s×75 f/s).

The keystring corresponding to the above series would be "CmAET?lp}". Other keystring notations can be used equally as well, such as, for example, representing the length of each track with a 5-digit number group instead of a 3-character group.

Four important pieces of information that are derived from the keystring are used in later portions of the process: (1) the number of tracks, which is the number of characters in the key string divided by three; (2) the length of each track, measured in frames; (3) the start-song time of each track, which for each track is the sum of the lengths of the tracks preceding it; and (4) the total time of the CD, which is the sum of the lengths of the tracks. If two CDs have identical keystrings, then there is a very high likelihood that the CDs are identical.

Figure 3B:
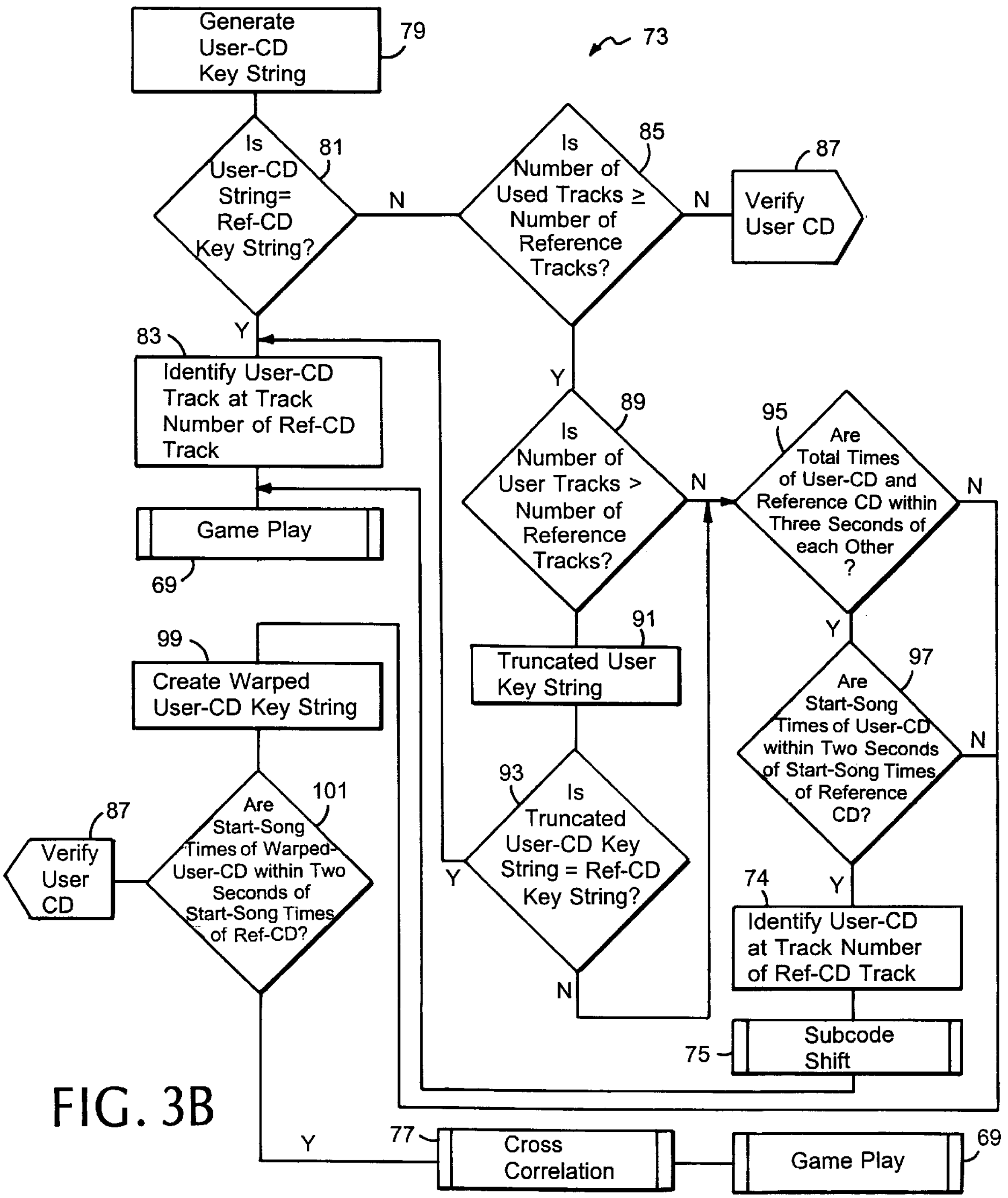

As described above, data base 41 of the interactive game program 33 includes a ref-CD keystring 49 associated with each of the one or more reference CD data 45. Referring now to the flow chart shown at FIG. 3B, at some point after the user inserts the user CD 35 into the CD ROM drive 11, game program 33 causes the computer 1 to generate a user-CD keystring (step 79) for the user CD and compares it with the ref-CD keystring 49 (step 81). If the two key strings are identical, then the computer determines that the user CD is identical to the reference CD. The user-CD track to be used for game play 69 is then identified as the music track on the user CD 35 that is at the same track position as is the reference-CD track on the reference CD (step 83). For example, if the reference-CD track for the selected song is located at track number 4 on the reference CD, then the music track at track position 4 on the user CD is identified as the user-CD track to be used for game play. The music data 55*a* associated with the selected song title 53*a* is then used in game play 69 without further adjustment.

If the keystrings do not match exactly, the computer applies a fuzzy-logic method of matching the two keystrings. First, the number of tracks on the user CD is compared with the number of tracks on the reference CD. If the number of tracks on the user CD 35 is less than the number on the reference CD (step 85), then there is no match. However, the program assumes that the user has inserted a user CD 35 that contains the selected song, and the computer runs a verify user CD routine (step 87), described in detail below.

Second, if the number of tracks on the user CD 35 is greater than the number of tracks on the reference CD (step 89), the user CD 35 may be a re-released version that has additional bonus tracks at the end. The computer truncates the user-CD keystring (step 91) so that the user-CD keystring is the same length as the ref-CD keystring 49, and uses the truncated user-CD keystring for further comparisons. If, after this truncation, the keystrings match exactly (step 93), then there is a match with no subcode shift or time warping. The computer 1 ignores the additional tracks on the user CD 35 and identifies the user-CD track to be at the track number of the reference-CD track for the selected song title 53*a*. The computer 1 uses the music data 55*a* associated with the selected song title 53*a* for game play (step 69).

Third, if the difference between the total playing times of the two CDs is less than a predetermined total time difference (step 95), and all of the start-song times on the user CD are within a predetermined start-song time difference of their counterparts on the reference CD (step 97), the computer 1 determines that the only difference between the reference CD and the user CD is caused by subcode shift. The computer 1 identifies the user-CD track to be at the track number of the reference-CD track for the selected song title 53*a* (step 74). The computer 1 then performs a subcode shift (step 75) on the music data 55*a* as described below. The subcode-shifted music data is used instead of the original music data for game play 69. In a preferred embodiment, the predetermined total time difference is approximately three seconds or less, and the predetermined subcode time difference is approximately two seconds or less.

However, if the difference between the total playing times of the two CDs is more than the predetermined total time difference, or if all the start-song times of the user CD 35 are not within the predetermined start-song time difference of the start-song times of the reference CD, the computer creates a warped-user-CD keystring (step 99). The warped-user-CD keystring is created by first multiplying all the start-song times on the user-CD keystring times a scaling factor equal to the reference-CD total playing time divided by the user-CD total playing time. The scaled start-song times are used to generate the warped-user-CD keystring as described above.

The ref-CD keystring 49 is then compared with the warped-user-CD keystring (step 101). If all of the start-song times from the warped-user-CD keystring are within the predetermined start-song time difference of their counterparts from the ref-CD keystring 49, then the assumption that the user CD 35 is time-warped relative to the reference CD is probably true. In this case, the computer 1 applies the methods described in the Cross-Correlation (step 77 in FIGS. 3A and 3B) section below to generate factors to correct the time warping and any subcode shift. These factors are then used to adjust the music data 55*a* for game play. Otherwise, if the start-song time difference condition is not met, the computer proceeds to the verify user CD routine (step 87).

Figure 3C:
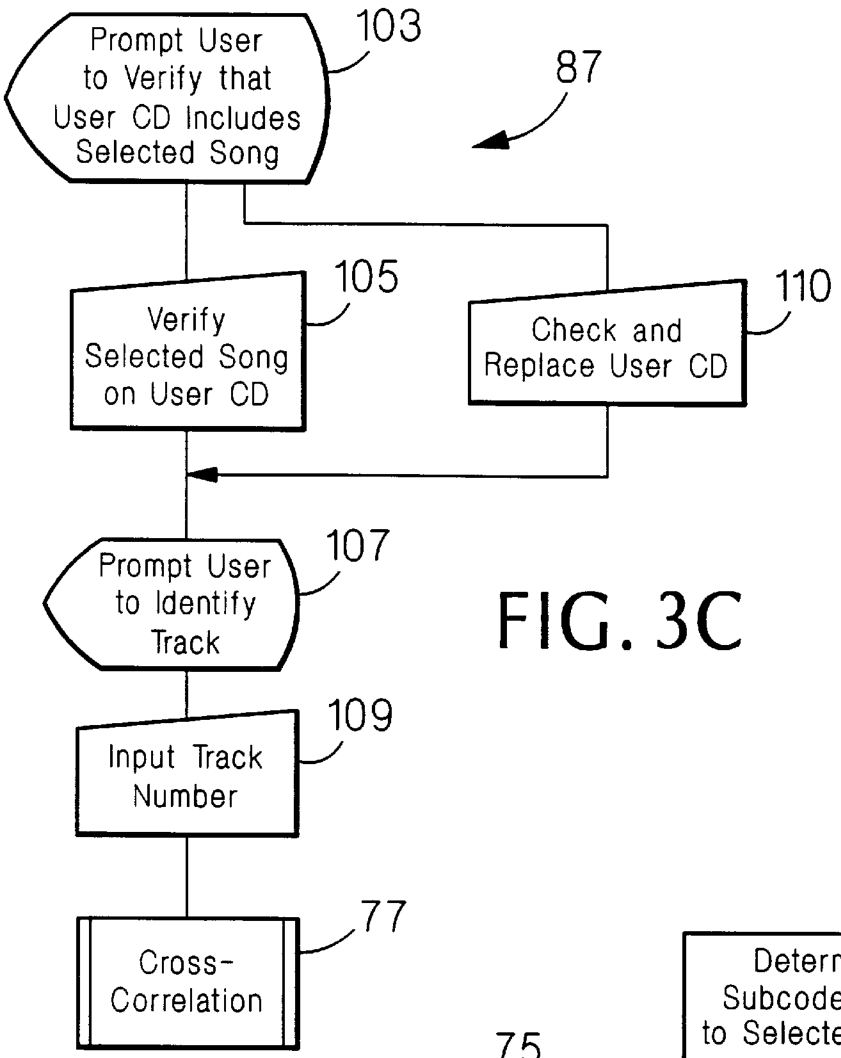

The verify user CD process 87 will be described now with reference to FIG. 3C. If the keystring matching was not successful, then either the user has inserted the wrong CD in the CD-ROM drive 11, or the user CD 35 may be a re-released, re-mastered or foreign version that has bonus tracks in the middle, or an edited or expanded version of one or more tracks, or some other fairly large difference is present. In this case the user is given another chance to either identify a selected track or replace the user CD. First, the computer 1 prompts the user to verify that the user CD 35 includes the selected song (step 103). The prompts can be visible prompts on the display 17, or audible prompts broadcast over loudspeakers 21, or both. If the user verifies that the user CD 35 includes the selected song, the computer 1 then prompts the user to input which track on the user CD 35 contains the selected song (step 107). The computer may prompt the user to insert a different user CD 35 (step 110) or choose a new song for game play if the user does not verify that the user CD 35 contains the selected song (not shown). It is assumed that the user CD 35, if it includes the selected song, has a different version of the selected song than does the reference CD. Therefore, after the user identifies the track containing the selected song (step 109), the identified track is handled as described in the section cross-correlation (step 77) below. If the cross-correlation fails to find a match, the program 33 assumes that the user is incorrect.

Subcode Shift

Figure 3D:
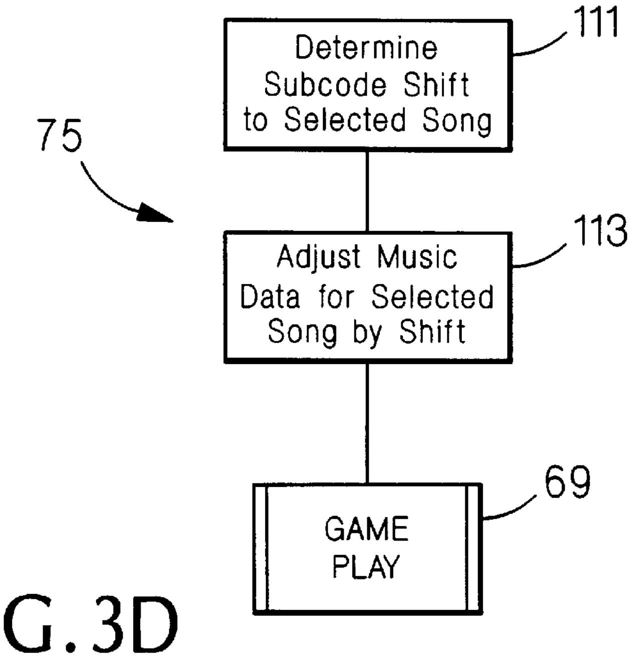

Referring now also to FIG. 3D, when a user CD 35 is very likely to have the same digital data stream as the reference CD, but just have different subcodes, the subcode shift correction 75 determines how far the start-song time for the user-CD track associated with the selected song 53*a* on the user CD 35 is shifted relative to the start-song time for the corresponding reference-CD track on the reference CD (step 111). This is done by adding the differences in time for the start-of-song times of all tracks up to the user-CD track. The accumulated difference is the determined shift. The music data 55*a* corresponding to the selected song is adjusted by this amount (step 113). The shifted music data is then used for game play 69.

Figure 5:
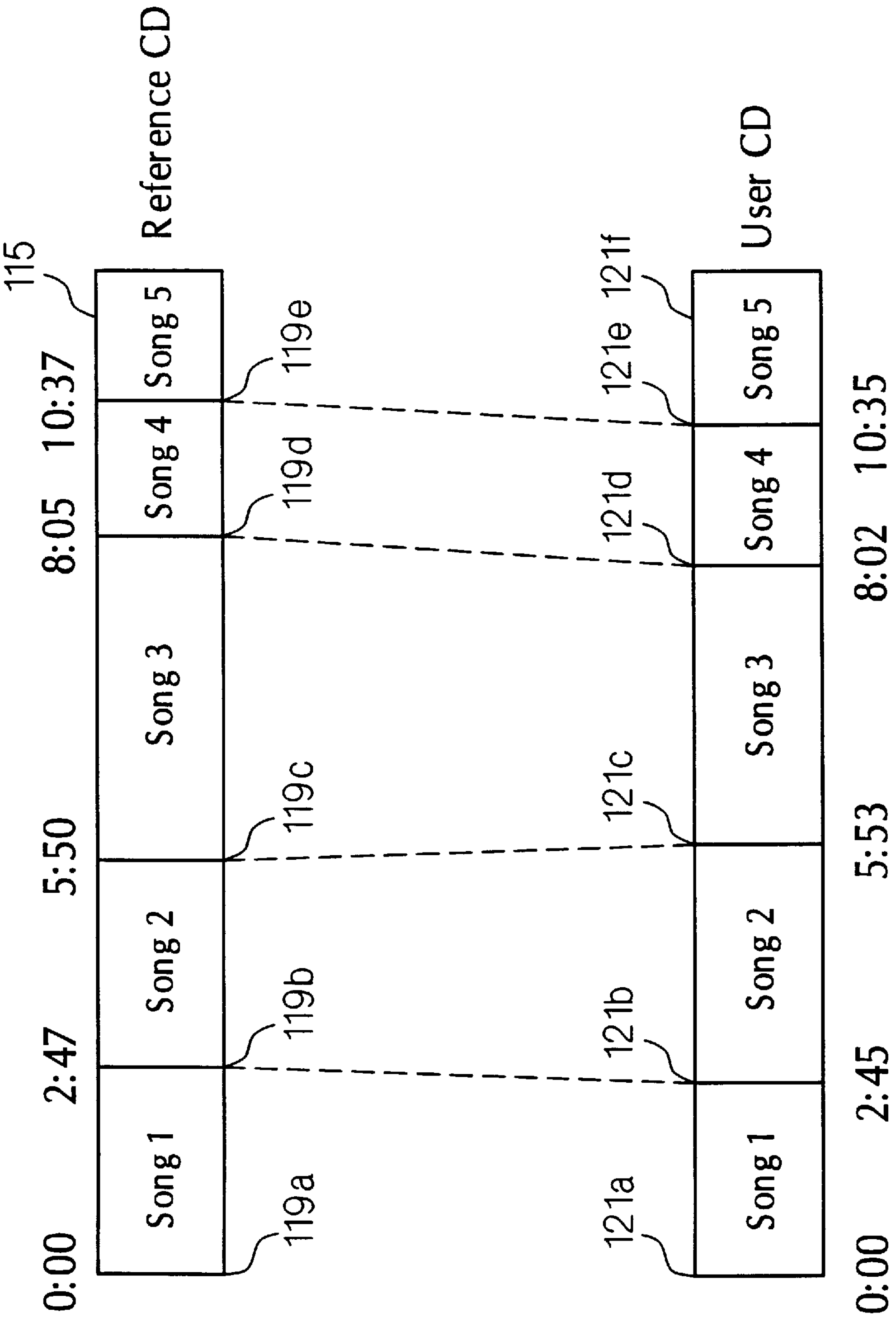
FIG. 5 illustrates a reference CD and a user CD partitioned into music tracks with different lengths.

Referring now also to FIG. 5, a bar representing a reference-CD time line 115 for the reference CD is shown at the top of the drawing. A user-CD time line 117 bar for the user CD is shown at the bottom of the drawing. Each CD has five songs, or music tracks, labeled Song1, Song2, . . . Song 5. Reference-CD start-song times 119*a*–119*e* are indicated for each of the five songs of the reference time line 115. User-CD start-song times 121*a*–121*e* are indicated for each of the five songs of the user-CD time line 117. The first start-song time for each CD is 0:00. After the first track, none of the reference start-song times 119*b*–119*e* are the same as the corresponding ones of the user-CD start-song times 121*b*–121*e*. The user-CD start-song times are different from the reference-CD start-song times for Song 2-Song 5 by −2 sec, +3 sec, −3 sec, and −2 sec, respectively. Applying the method described above, the determined accumulated shift for Song 4 would be −3 seconds. If, for example, the user-CD track corresponding to the selected song 53*a* is located at track 4, the accumulated shift (−3 seconds) would be added to the music data 55*a*.

Cross-Correlation

Cross-correlation techniques can be used to find a correspondence between different sets of data that may be obscured by noise. See, for example, *Principles of Communications,* by Ziemer and Tranter, Section 5.3. In specialized applications, such as military radar, cross-correlation techniques are used to find a return signal in the presence of large amounts of noise and/or deliberate jamming.

In the cross-correlation routine 77, the computer 1 uses a cross-correlation technique to determine how the timing of the user-CD track for the selected song 53*a* has changed relative to the corresponding reference-CD track on the reference CD. The change typically includes some time warping in combination with a subcode shift.

Figure 3E:
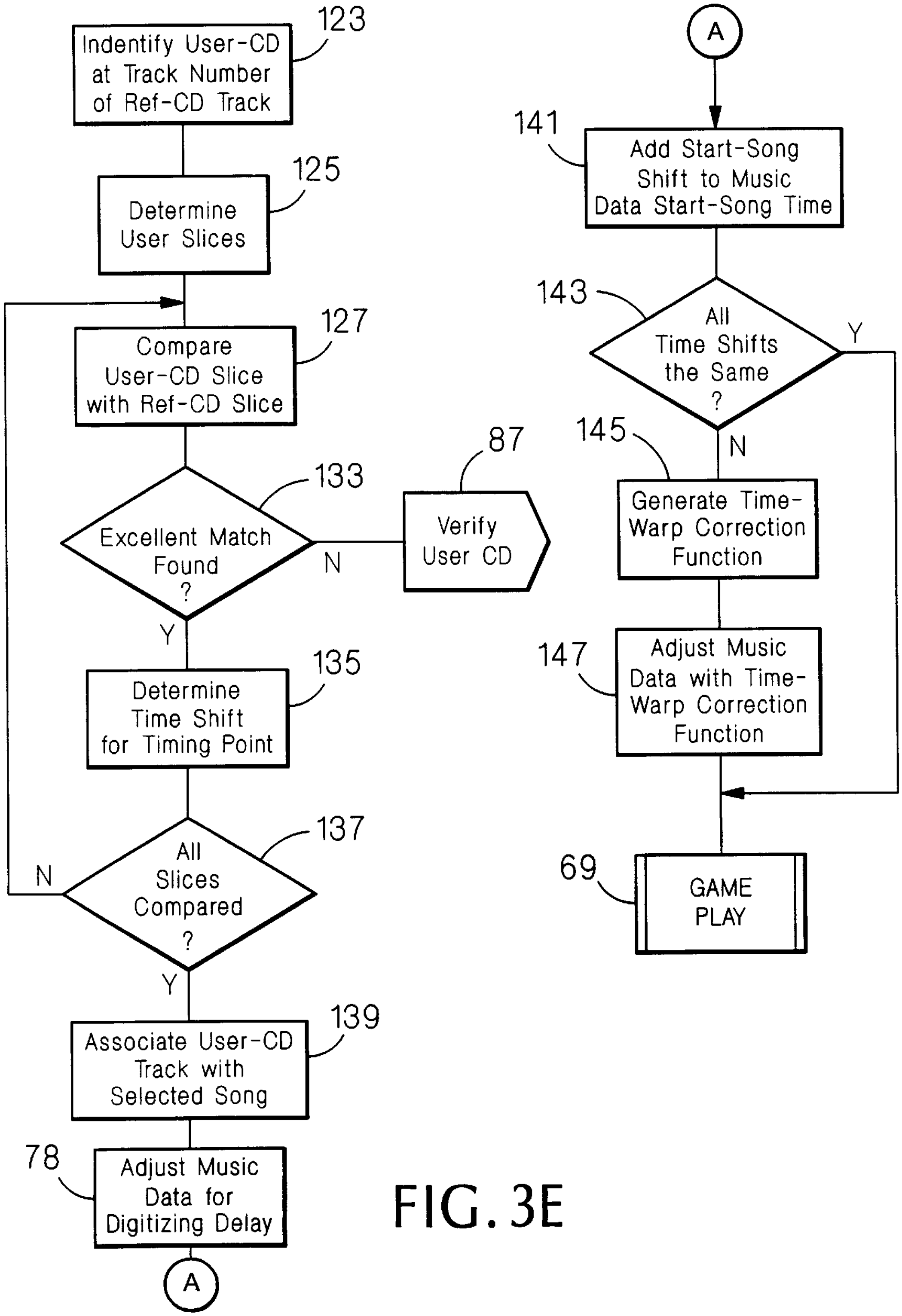

Referring now also to FIG. 3E, the computer 1 first identifies a user-CD track on the user CD 35 at the same track number as the reference-CD track corresponding to the selected song 53*a* on the reference CD (step 123). The identified user-CD track is the music track on the user CD 35 most likely to include data representing the selected song.

The data base 41 includes at least three approximately one-second "slices" of data (ref-CD slices 58*a*) from known timing points of the reference-CD track from which the music data 55*a* for the selected song 53*a* was derived. A "slice," as used in this description, is a known number of contiguous samples of the digital audio stream. A one second slice therefore includes 75 frames of data. In the described embodiment, a first timing point is near the beginning of the reference-CD track, a last timing point is near the end of the track, and the others are evenly distributed between the first and last timing points.

In the next step of the cross-correlation process, the system sound card digitizes a corresponding number of user-CD slices of data from the identified user-CD track of the user CD 35 (step 125). User-CD slices are longer than ref-CD slices 58. In the described embodiment, user-CD slices are approximately five times longer than the ref-CD slices, or approximately five seconds long. Each user-CD slice includes data samples in a window between about two seconds before to about two seconds after the known beginning and ending times of the corresponding ref-CD slice. In theory, therefore, if the data on the identified user-CD track and the data on the reference-CD track are relatively shifted no more than two seconds of one another, at some point the user-CD slice should contain the same data as the ref-CD slice 58. If the data were identical (no time warping), then the data starting at two seconds into a user-CD slice would be identical to the data in the corresponding ref-CD slice 58.

Figure 6A:
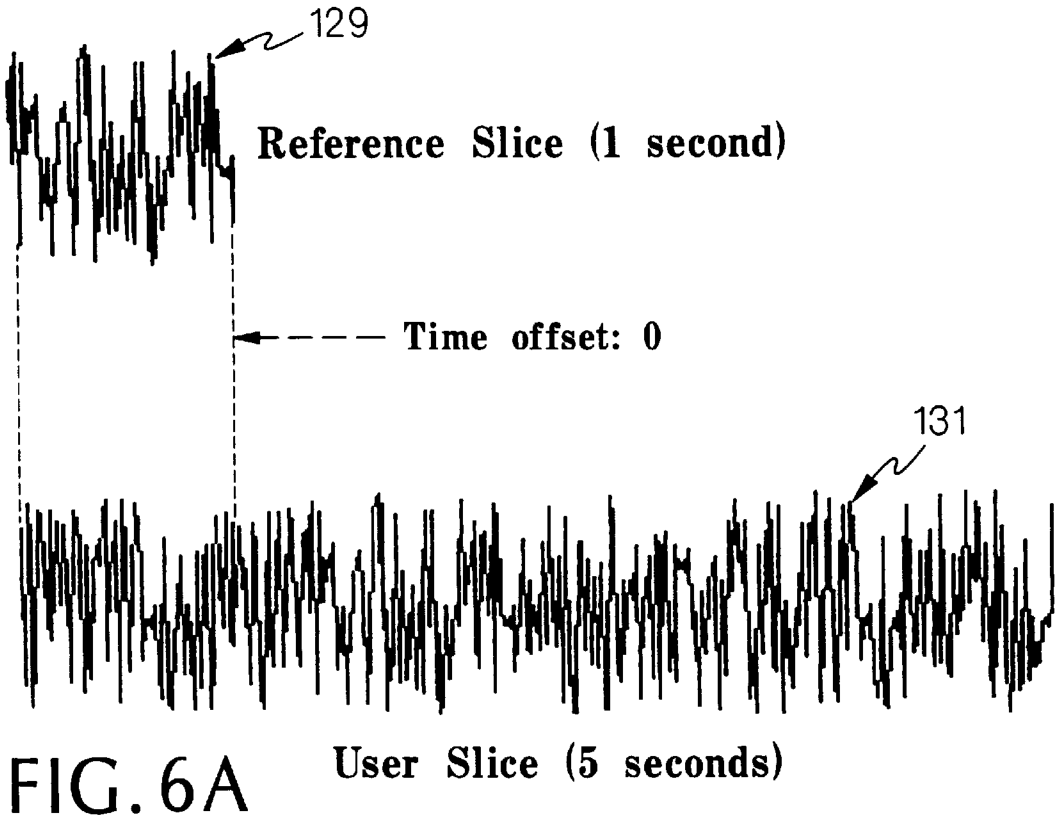
FIGS. 6A–6D illustrate a reference-CD slice and a user-CD slice, wherein the reference-CD slice is progressively shifted for comparing with the user slice.
Figure 6B:
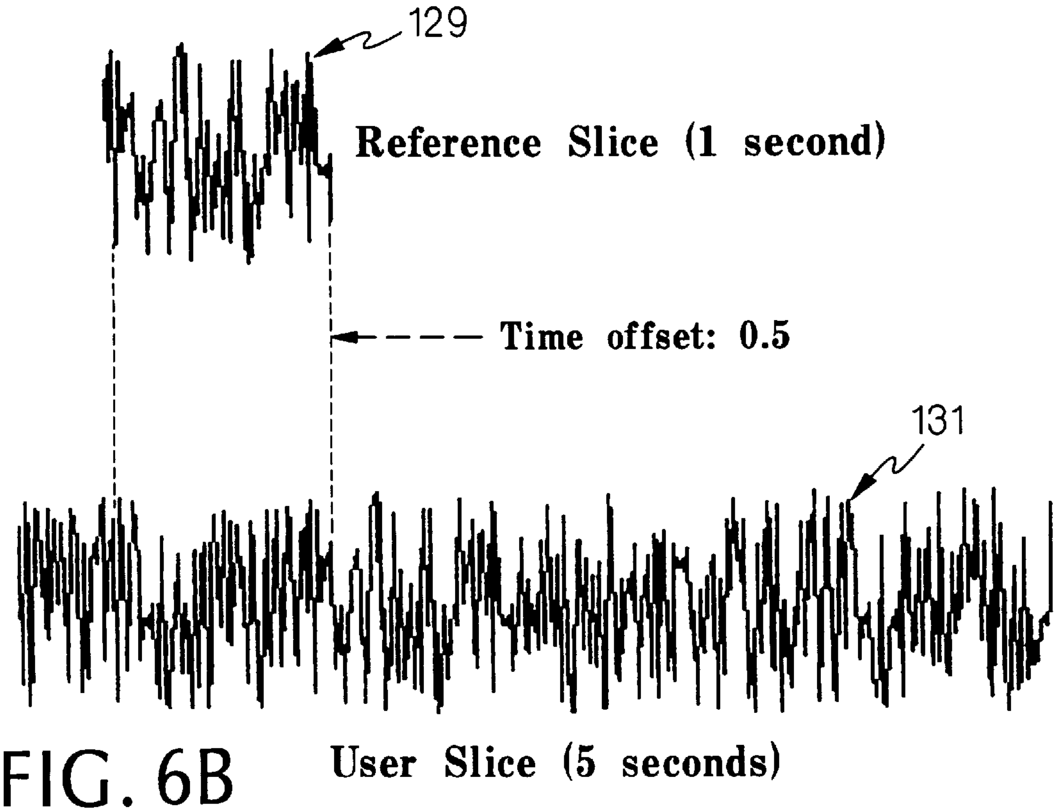
Figure 6C:
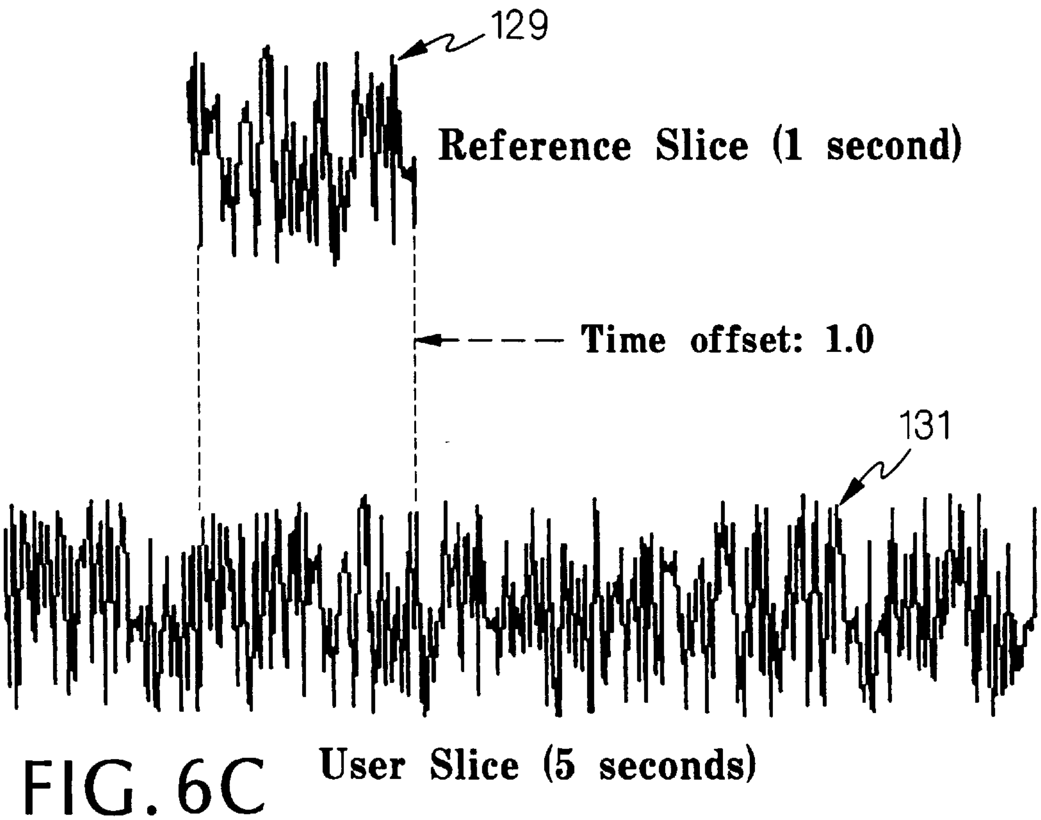
Figure 6D:
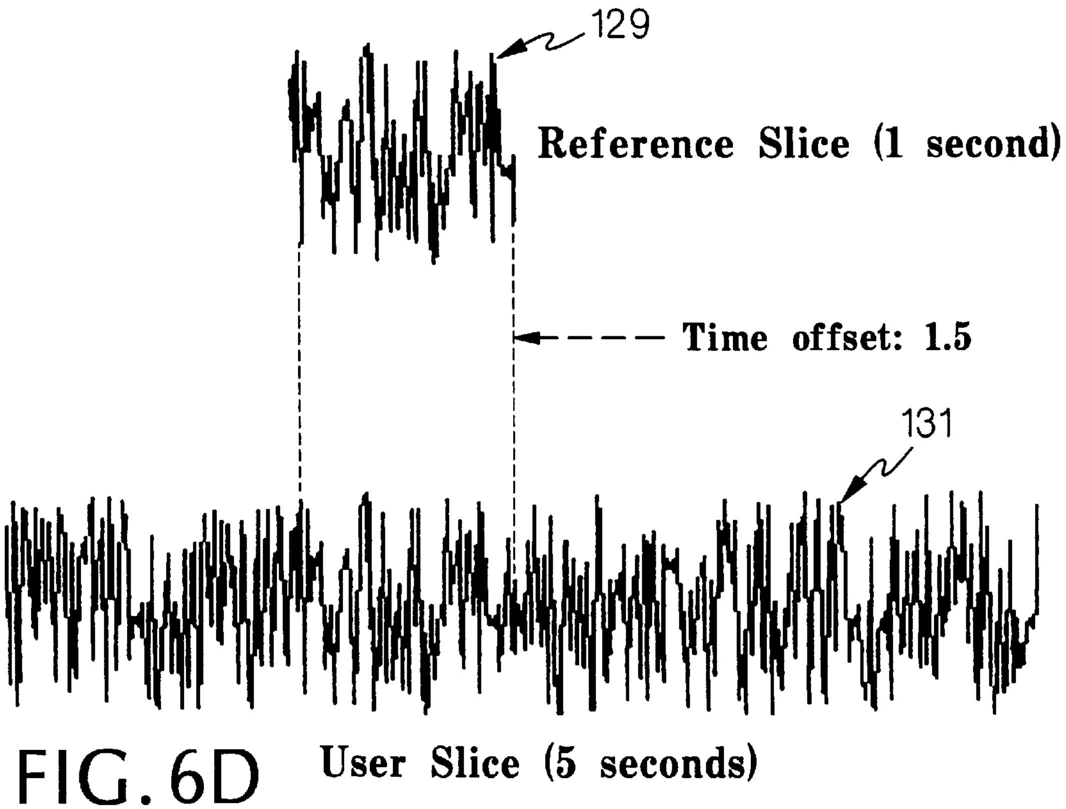

The next step is to iteratively compare each ref-CD slice 58 with like-sized pieces of the corresponding user-CD slice (step 127). Refer now also to FIGS. 6A–6D, each of which diagrammatically illustrates a ref-CD slice 129 that is one second long and a user-CD slice 131 that is five seconds long. The first comparison starts at the beginning of the user-CD slice 131 (FIG. 6A). The ref-CD slice is then shifted relative to the user-CD slice in a small increment and the comparison repeated. FIGS. 6B–6D show relative shifts of 0.5, 1.0 and 1.5 seconds, respectively. In actual practice, the incremental shift will be much smaller than 0.5 seconds. If a typical data feature has minimal extent in time, an effective incremental shift would be a fraction of that time. For example, if a distinctive sound feature, such as a drum rim-shot, is 0.2 seconds long, then an effective shift may be one tenth of that time, or 0.02 seconds.

The shifting and comparing continues until either an excellent match is found (step 133) or the end of the user-CD slice 131 is reached. If the match is not close enough, the verify user CD routine 87 is called. If an excellent match is found, the computer 1 determines the time shift for the timing point corresponding to the ref-CD slice 129 and the user-CD slice 131. The time from the start-song time 121 for the music track on the user CD 35 to the beginning of the matched section in the user-CD slice 131 is compared to the same figure which is already known for the reference slice 121. The difference provides the time shift that will be associated with this timing point. The process described above with reference to steps 127, 133, and 135 is repeated until time shifts are determined for all timing points (step 137). If all slice comparisons find excellent matches, then the computer associates the identified user-CD track with the selected song (step 139).

Before proceeding further, the computer makes a correction for a digitizing delay in the computer system's sound card 19 (step 78). This adjustment compensates for a small digitizing delay that is inherent in the operation of the sound card 19, as will be described in greater detail below.

Assume that the first one-second ref-CD slice 129 is taken from the reference CD starting from three seconds after the start-song time of the reference-CD track for the selected song. The five-second user-CD slice 131 would therefore be taken from the identified user-CD track on the user CD 35 starting from one second after the start-song time (3 sec–2 sec). Assume also that the comparison showed an excellent match of the ref-CD slice 129 starting at 2.5 seconds into the user-CD slice 131. Ideally, the ref-CD slice 129 should start matching the user-CD slice at exactly two seconds into the user-CD slice 131, but the comparison shows that the music on the user CD 35 actually starts one-half second later than the music on the reference CD (2.5 sec–2 sec). Therefore, to synchronize the music data 55 correctly to the start of the corresponding user-CD track on the user CD, a start-song shift of one-half second is added to the start-song time in the music data (step 141). If all the time shifts are the same, then the synchronization process is done (step 143), and the adjusted music data 55*a* can be used for game play 69.

If all the time shifts are not the same, the user-CD track is time-warped relative to the reference-CD track, and therefore also time-warped relative to the music data. The start-song shift corrects for subcode shift at the start of the song, but does nothing to adjust for time warping. To correct for time warping, the timing shift determined for each timing point is used to generate a time-warp correction function that is characteristic of the direction and magnitude of the time warping (step 145). The time-warp correction function is then applied to the music data 55*a* to synchronize the music data 55*a* with the data on the user-CD track (step 147). The synchronized music data is used for game play 69.

For example, referring to the case summarized at Table 1, the difference in timing between the reference-CD track and the user-CD track is a constant two seconds for each of three slices. The user-CD track has a two second subcode shift relative to the reference-CD track, but there is no time warping. Therefore, simply shifting the music data 55 by two seconds will synchronize it correctly.

TABLE 1

| Slice # | Reference CD | User CD |
|---|---|---|
| 1 | 0:00 | 0:02 |
| 2 | 1:24 | 1:26 |
| 3 | 2:47 | 2:49 |

Now refer to Table 2. The amount of shift in this case is not constant. The user-CD track on the user CD 35 runs longer than the reference-CD track, i.e. it is "expanded." The timing in the music data 55 needs to be shifted by two seconds to adjust for the relative shift between the first user slice 131 and the first reference slice 129. In addition, the computer 1 must apply a correction function to the music data 55 to correct for the expansion.

TABLE 2

| Slice # | Reference CD | User CD |
|---|---|---|
| 1 | 0:00 | 0:02 |
| 2 | 1:24 | 1:28 |
| 3 | 2:47 | 2:53 |

In this case, the expansion is linear, so the function is simple. Expanding the timing of the music data 55 by 2.4% will provide the correction. The subcode shift and time warping correction function for the music data is given by the relation:

$$T_{new}=(1.024\times T_{old})+2\text{ sec},$$

where $T_{old}$ is a timing point of the unadjusted music data and $T_{new}$ is a corresponding adjusted timing point.

Other cases may not be so simple. If all time warping was linear, then only two data points at the beginning and end of a user-CD track would be needed to establish the correction factor. However, in most cases, the computer will have to derive a higher order correction function. The accuracy of this function is determined by the number of data points—an increased number of slices will increase the accuracy of the correction function. However, there is a trade-off between accuracy and speed. Adding more slices increases processing time and complexity. Another factor in determining the best number of slices is the length of the music track. A longer music track can require more slices than a shorter music track to achieve the same level of correction accuracy.

Figures 7, 8:
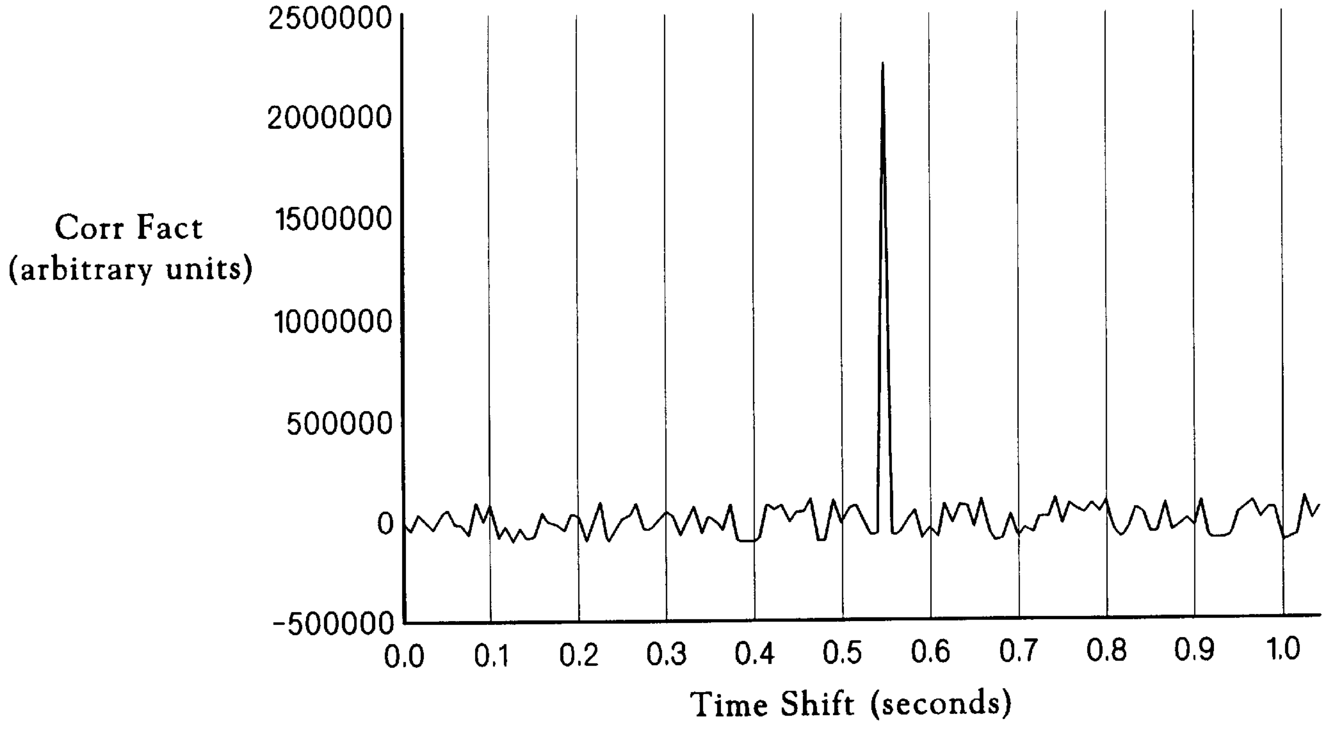
FIG. 7 shows a pseudocode representation of a mathematical function for performing a cross-correlation.
FIG. 8 is a plot of correlation factor values as a function of time shift.

In the described embodiment, a cross-correlation function is used to compare the user-CD slices with the ref-CD slices. FIG. 7 illustrates a mathematical description of the cross-correlation function (149). CorrFact[shift] is an array of correlation factor values associated with corresponding time shifts. RefSlice[sample] is an array characteristic of the ref-CD slice. Each data value, or sample, of RefSlice is equal to the corresponding data value of the ref-CD slice 129 minus the average value of the ref-CD slice 129. The RefSlice array has SLICE_SIZE data values, or samples. In the described embodiment, RefSlice is one second long. Since there are 44100 samples in a second, SLICE_SIZE is 44100. UserSlice[sample+shift] is an array characteristic of the user-CD slice 131. Each data value, or sample, of UserSlice is equal the corresponding data value of the user slice 131 minus the average value of the user slice 131. In the described embodiment UserSlice has five times as many samples as RefSlice because UserSlice is five seconds long. The time shift variable, shift, is a time offset measured in samples. Shift ranges from 0 to +176399, or 0 seconds to +4 seconds, corresponding to comparisons between the ref-CD slice and the user-CD slice at the beginning and at the end of user-CD slice, respectively.

To obtain each value of CorrFact, the product of RefSlice with Userslice is calculated for each sample from 1 to SLICE-SIZE (44100) while holding the shift variable constant. The products are summed to provide CorrFact[shift] (step 149). Shift is then incrementally changed and the sum of the products taken again. Because the values of each of RefSlice and UserSlice are centered around zero, and because for most values of shift RefSlice and UserSlice will be poor matches, the sum of their products will be a small number, which may be positive or negative, for most shift values. However, when the shift is such that RefSlice and UserSlice are closely matched, CorrFact will be a large positive value.

An example of a typical CorrFact[shift] is plotted at FIG. 8. The amplitude of CorrFact is plotted in arbitrary units as a function of time shift in seconds over a range of 0.0 sec–1.0 sec. For most of its range, CorrFact is a small number varying around the base-line. There is a single, sharp peak at a shift of about 0.55 seconds. Thus, there is a good match between RefSlice and UserSlice at about 0.55 seconds offset. For each pairing of a user-CD slice and a ref-CD slice, the computer 1 determines the maximum value of CorrFact and the shift for the maximum value (step 151).

The pseudocode for the algorithm that compares the two samples is shown in FIGS. 9A and 9B. In FIG. 9A, sizes of variables and arrays are set up, and initial values also set. SLICE_SIZE, the number of samples per slice is set to 44100 (153). The number of samples to shift after a failed comparison (SHIFT_SIZE) is set to 1 (155). TOTAL_SHIFTS is the number of times to shift (157). The "RefSlice" array is set up with 44100 elements (159). Array "UserSlice" has five times as many elements as RefSlice (161). "Success" is a YES or NO variable with a starting value of NO (163). The "Shift" variable is an integer with a starting value of 0 (165). "Count" is an integer (167) that is used as a counter for a loop. "CorrFact" is a signed integer array (169). "BestFact," which stores the maximum value of CorrFact, is a signed integer with a starting value of 0 (171). "BestTime" is an integer which will store the time shift corresponding to BestFact (173).

Referring now also to FIG. 9B, the cross-correlation algorithm has two nested loops. Loop 1 indexes Count from 1 to TOTAL_SHIFTS (175). Each time Count is raised, CorrFact is reset to zero (177). Loop 2 calculates CorrFact for a given shift (179). After each new calculation of CorrFact, the computer determines if the calculated CorrFact is greater than BestFact (181). If this is true, then BestFact is reset to be equal to CorrFact (183), and BestShift is set equal to the shift for CorrFact (185). Shift is then indexed up by SHIFT_SIZE (187), and steps 177, 179, 181, 183 and 185 repeated until shift equals TOTAL-SHIFTS (189). At this point, the maximum value of the CorrFact [shift] will be in BestFact, and the corresponding time shift will be in BestShift.

The correlation factor is a number whose value is directly proportional to the degree of similarity between compared slices. A large maximum in the correlation function is thus an indicator that a good fit was found at the shift having the maximum value. To determine if the match is good enough to associate the user-CD track with the reference-CD track, BestFact is compared with a predetermined THRESHOLD (191), which is empirically determined. If BestFact is greater than THRESHOLD, then a match is declared. Success is set to YES, indicating that a good match was found (195). TimeOffset, measured in seconds, is calculated from shift 193. TimeOffset is the time shift between the ref-CD slice and the user-CD slice at the timing point at which the slices were taken. If BestFact is not greater than THRESHOLD, then no adequate match was found, and Success is set to NO (197).

As discussed above, if the match between the compared slices is not good, the computer 1 runs the verify user-CD routine 87. Otherwise, the cross-correlation algorithm is repeated for subsequent pairs of ref-CD and user-CD slices associated with other known timing points. Once the time shifts for all the known timing points are calculated the computer determines the correction function from the timing shifts. The correction function can be, for example, an nth order polynomial, where n+1 is the number of timing points. Other correction functions can also be used. The correction function is then used to adjust the timing of the music data for the selected song.

Correction for Digitizing Delay

Digitizing audio data is not a quick process. The CD-ROM Drive 11 in computer 1 delivers an audio signal to the sound card 19. The sound card 19 samples and digitizes the audio signal in real time, one sample every 22.68 microseconds, but the data is not delivered to the processor 3 at that rate. Instead, as samples are created they are stored in a buffer in memory area 5, and only when the buffer is full is the stored digitized signal delivered to the processor. This temporary storing and delivery process is managed by the sound card driver software. The digitizing delay resulting from the process of digitizing the audio signal and storing and delivering the digitized signal will skew the timing of the music data.

The amount of digitizing delay depends on the design of the software and hardware components of the sound system. Therefore, it varies between different sound cards, and can even change in the same sound card if a revised version of the driver software is installed. The cross-correlation process can only be accurate if the digitizing delay can be quantified for the particular system running the game program 33. Typically, the digitizing delay will be very small, about a millisecond or less.

Figure 10:
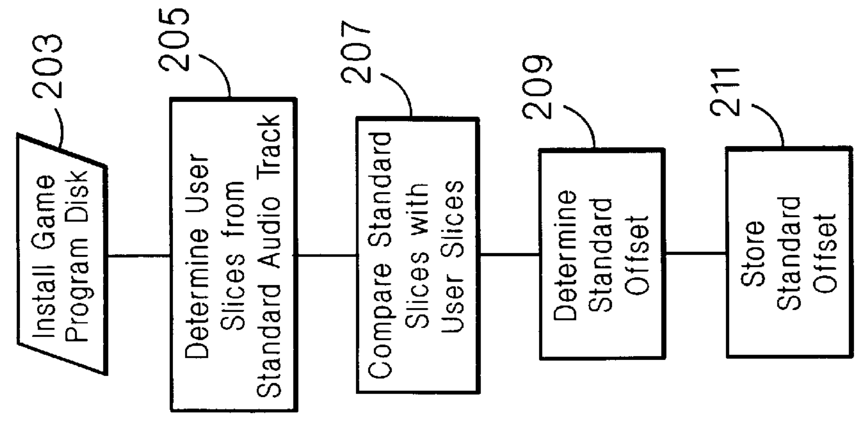
FIG. 10 is a flow chart that describes the calculation of the sound card digitizing delay.

To quantify the digitizing delay, the CD on which the game program 33 is distributed includes a "Red Book," or standard audio track 199 of known content, and standard data slices 201 taken from known timing points of the standard track 199. (FIG. 2) Referring now to FIG. 10, when game program 33 is first installed on computer 1 (step 203), the computer runs a cross correlation between the standard slices and new slices taken from the standard audio track 199. Because the positions of the timing points of the standard slices are known, the game program 33 can generate a standard offset that is representative of how long the digitizing process of the standard track 199 takes on the user's system.

The computer determines user slices from the known timing points of the standard audio track for use in the cross correlation (step 205). The computer then compares the standard slices 201 with the previously determined user slices (207). An excellent match will always be found because the standard slices 201 are taken from the standard audio track 199. The computer 1 determines a standard offset based upon the comparison (step 209). The standard offset is typically a constant delay. The computer then saves the standard offset in memory 5 (step 211) and uses the standard offset to correct the time measurements for future digitizing operations (see the above description of FIG. 3E, step 78). Because the digitizing delay causes the stream of digitized data from the user CD 35 to lag behind the audio playback of the user CD 35, the music data 55 is advanced to adjust for the digitizing delay.

Auto-Adjustment Algorithm

There remains a small chance that the subcode shift and/or time warping correction for a particular song is calculated incorrectly. The visual prompts 39 are synchronized with the music data during game play. If the timing of the music data is adjusted incorrectly, then the visual prompts will provide inaccurate cues for the user to play along with the music being played back from the user CD.

To help correct for this, the game program 33 includes a heuristic algorithm that looks for timing-related trends in the user's play. The algorithm dynamically corrects the music data timing under the assumption that the player usually tries to play the game properly. For example, if the player consistently plays ahead of the playback from the user CD by a fixed timing shift, the algorithm gradually shifts the timing of the music data to correct for the timing shift. The user is under the impression that he or she is playing better as the song progresses.

Figure 11:
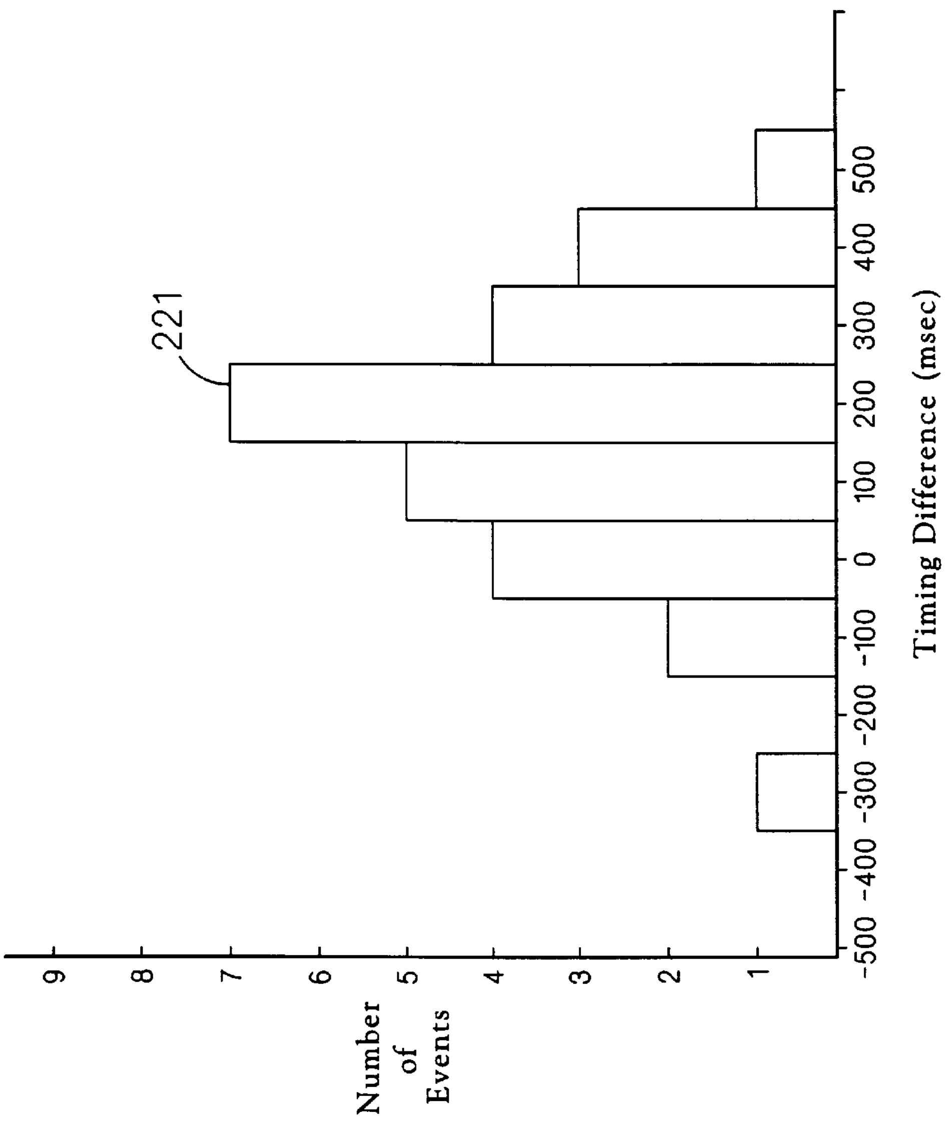
FIG. 11 is a histogram illustrating a distribution of the timing of a user's play relative to the music data.

Note that the heuristic algorithm looks for trends and not just at differences between what the user plays and the expected music data. FIG. 11 graphically illustrates a distribution of the timing differences between the notes the user plays and the expected music data. For example, if the user's play is ahead of the music data, the timing difference will be negative. If the user's play lags the music data, the timing difference will be positive. If the timing data is correct, the user's "misses" will have a roughly bell-shaped distribution 221 centered around the correct timing. The data in FIG. 11 shows that after 26 events there is a peak 221 at a timing difference of about 0.2 seconds, indicating that the user's play lags the music data by about that much. Although the histogram illustrated in FIG. 11 shows the timing difference partitioned into 0.1 second bins, the accuracy of the determined peak position can easily be increased by more finely partitioning the timing differences.

Figure 12:
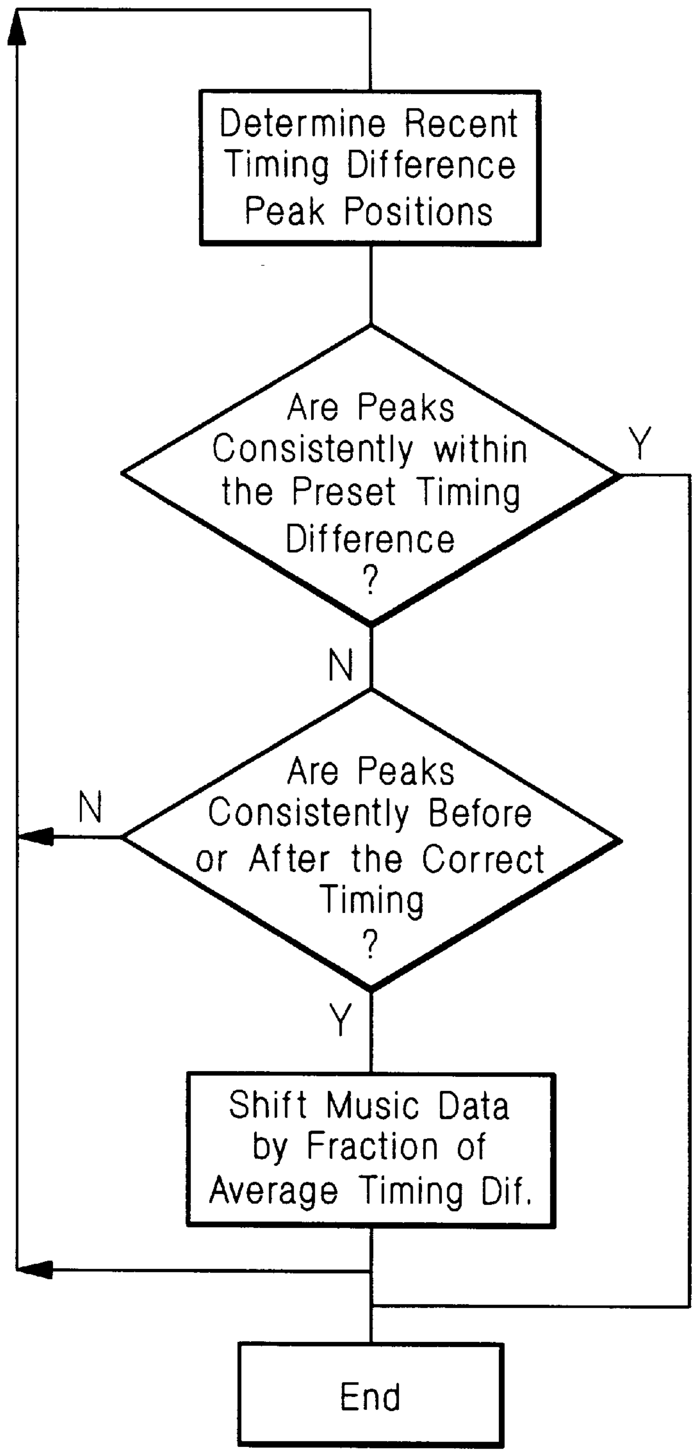
FIG. 12 is a flow chart that describes an algorithm that dynamically adjusts for delays in the user's play.

The correction process is diagrammed in the flow chart illustrated in FIG. 12. The dynamic correction algorithm periodically determines the position of the peak 221 in this distribution (step 223). The computer determines if the peak of the curve consistently lies within a preset timing difference from the true time (step 225). If it does, the dynamic correction algorithm stops (step 227). If the computer determines that the peak 221 is consistently before or after the correct timing, i.e. a nonzero value (step 229), for example, after being determined three times, the timing of the music data is shifted by a smaller amount (step 231). For example, the music data can be shifted by about 5% of the timing difference between the average peak position and the correct timing point, in the proper direction. This process is repeated until the peaks in the timing difference histogram are consistently within the preset timing difference (steps 225 and 227).

Local Timing Database

The described process allows the computer to determine whenever the user CD is not an exact match to the reference CD. The music data timing is then resynchronized with the user CD so that the user can play with the selected song successfully. The computer 1 can store CD identification and timing information in a small database on the hard disk drive 7 for future use. If the same user CD is again used for game play, all the timing operations will be readily available and will not have to be recalculated.

It should be understood that data base 41 can be packaged together with game code 43, or packaged separately. Additional sets of reference CD data 45 may also be packaged separately from game program 33, or down-loaded by the user from the internet or another source. It will also be understood that data base 41 can be organized differently than in the described embodiment.

Instead of using ref-CD slices 58 for the cross-correlation as described above, the game program 33 can compare slices from the user-CD with slices of data taken from the music data 55 associated with the selected song title 53. Music data for a song track is derived from a reference-CD music track, and therefore is representative of the reference-CD music track. As a consequence, the music data track should have the same timing characteristics as the reference-CD track. When used in the cross-correlation routine 77, music-data slices should be just as effective as ref-CD slices 58 in determining timing shifts. Music-data slices can be stored in data base 41, or can be determined as part of the cross-correlation routine 77.

In another embodiment, only a portion of the data samples in each of the ref-CD slice and the user-CD slice are used to calculate cross-correlations. For example, every second or fifth sample may be used. The resulting cross-correlation will probably not be as sharply peaked because the resolution is reduced by using fewer data points that are less closely spaced apart. However, this method provides several advantages. The processing time for the cross-correlation routing will be reduced. Less buffer space is needed for the cross-correlation calculation, and less storage is needed for the ref-CD slices.

The described song identification and synchronization methods have been described with reference to an interactive computer game program stored on a CD, for use with audio CDs supplied by the game player. The invention may be applicable also to game programs and audio tracks stored on other computer-readable media, now known or yet to be discovered.

Having thus described illustrative embodiments of the invention, it will be apparent that various alterations, modifications and improvements will readily occur to those skilled in the art.

What is claimed is:

1. A computer program being stored on a media readable by a general purpose computer, for configuring the computer upon being read and executed to perform functions comprising determining which of a plurality of music tracks on a user compact disk (CD) comprises digital data representing a selected song, the selected song also being represented by digital data on a reference-CD track on a reference CD, the user CD being inserted in a CD-ROM drive of the general purpose computer, the determining comprising:

identifying a user-CD track on the user CD most likely to comprise data representing the selected song;

cross-correlating data representative of the user-CD track with data representative of the reference-CD track to produce cross-correlation data having values each being characteristic of a degree of correspondence between the user-CD track and the reference-CD track for an associated timing offset between the user-CD track and the reference-CD track;

determining a maximum value of the cross-correlation data; and associating the user-CD track with the selected song if the maximum value exceeds a threshold value.

2. The computer program of claim 1, wherein the data representative of the user-CD track includes data representative of a user-CD slice of data from a known timing point on the identified music track, and wherein the data representative of the reference-CD track includes data representative of a reference slice of data from the known timing point on the reference-CD track.

3. The computer program of claim 2, wherein the known timing point is located a short time after the beginning of the user-CD track and the reference-CD track.

4. The computer program of claim 1, wherein the data representative of the user-CD track includes data representative of a plurality of user-CD slices of data from known timing points on the user-CD track, and the data representative of the reference-CD track includes data representative of a plurality of reference-CD slices of data from the known timing points on the reference-CD track, cross-correlating includes producing a plurality of cross-correlation data sets by cross-correlating each user-CD slice with a reference-CD slice from the same timing point, determining a maximum value of the cross-correlation data includes determining a maximum value for each cross-correlation data set, and associating includes associating the user-CD track with the selected song if the maximum value determined for each cross-correlation data set exceeds the threshold value.

5. The computer program of claim 4, further comprising determining a synchronizing function that adjusts for timing differences between the user-CD track on the user CD associated with the selected song and the reference-CD track based upon the timing offsets associated with the maximum values of the cross-correlation data sets.

6. The computer program of claim 5, the functions further comprising synchronizing music data with the user-CD track on the user CD associated with the selected song, wherein the music data comprises data representing notes corresponding with notes from the selected song.

7. The computer program of claim 1, wherein identifying the user-CD track includes:

generating user-CD key data indicative of the order and respective playing times of the plurality of music tracks on the user CD;

comparing the user-key data to a reference-key data indicative of the order and respective playing times of the music tracks on the reference CD; and based upon the comparison, determining the music track on the user CD most likely to represent the selected song.

8. The computer program claim 7, wherein comparing the user-key data to the reference-key data includes comparing the number of music tracks on the user CD with the number of music tracks on the reference CD.

9. The computer program of claim 8, wherein identifying the user music track further includes discarding a portion of the user-key data indicative of excess music tracks if the number of music tracks on the user CD exceeds the number of music tracks on the reference CD, and recomparing the user-key data with the reference-key data.

10. The computer program of claim 8, wherein, if the number of music tracks on the user CD is less than the number of music tracks on the reference CD, identifying the user music track further includes providing an output that prompts a user to do at least one of:

provide input identifying the user music track with the selected song; and replace the user CD in the CD-ROM drive with a different user CD.

11. The computer program of claim 8, wherein comparing the user-key data to the reference-key data further includes:

determining if a total-playing-time condition is met, the total-playing-time condition being met if a total of the playing times of the music tracks on the user CD is within a predetermined total-time difference of a total of the playing times of corresponding music tracks on the reference CD; and determining if a start-song condition is met, the start-song condition being met if start-song codes of each of the music tracks on the user CD are within a predetermined start-song time difference of start-song codes of corresponding music tracks on the reference CD, the start-song code of each music track on a CD being the accumulated playing times of all preceding music tracks on the CD.

12. The computer program of claim 11, wherein, if either of the total-playing-time condition and the start-song condition is not met, identifying the user music track further includes:

scaling the start-song code of each music track on the user CD by a factor equal to the total of the playing times of the music tracks on the reference CD divided by the total of the playing times of corresponding music tracks on the user CD; and determining if the start-song condition is met for the scaled start-song codes.

13. The computer program of claim 12, wherein, if the start-song condition is not met for the scaled start-song codes, identifying the user music track further includes providing an output that prompts a user to do at least one of:

provide input identifying the user music track with the selected song; and replace the user CD in the CD-ROM drive with a different user CD.

14. The computer program of claim 4, wherein each reference slice is longer than the corresponding user slice.

15. The computer program of claim 14, wherein each reference slice of data is approximately five times longer than the corresponding user slice of data.

16. The computer program of claim 8, wherein the user-key data is represented by a user-key-string comprising a concatenated string of equal-length character strings, each character string being representative of the playing time of a music track on the user CD, the order of the character strings in the user-key-string being indicative of the order of the music tracks on the user CD.

17. A computer program being stored on media readable by a general purpose computer configured with a CD-ROM drive, for configuring the computer upon being read and executed to perform functions comprising:

synchronizing music data being stored on media readable by the computer with a user-CD track on a user-CD compact disk (CD) inserted in the CD-ROM drive, wherein the user-CD track comprises digital data representing a selected song, the selected song also being represented by digital data on a reference-CD track on a reference CD, the music data being representative of notes based upon the reference-CD track, the synchronizing including:

generating user-CD data characteristic of the digital data on the user-CD track;

comparing the user-CD data with reference-CD data characteristic of the digital data on the reference-CD track;

based upon the comparison, generating a synchronization function which compensates for time warping, the synchronization function being characteristic of timing differences between the reference-CD track and the user-CD track; and adjusting the timing of the music data with the synchronization function.

18. The computer program of claim 17, wherein comparing includes cross-correlating the user-CD data with the reference-CD data, producing cross-correlation data each having values being characteristic of a degree of correspondence between the user-CD track and the reference-CD track for an associated timing offset between the user-CD track and the reference-CD track.

19. The computer program of claim 18, wherein the user-CD data includes data representative of a plurality of user-CD slices of data from known timing points on the user-CD track, and the reference-CD data includes data representative of a plurality of reference-CD slices of data from the known timing points on the reference-CD track, cross-correlating includes producing a plurality of cross-correlation data sets by cross-correlating user-CD data representing each user-CD slice with reference-CD data representing a reference-CD slice associated with the same timing point, and determining the timing offset associated with a maximum data value for each cross-correlation data set.

20. The computer program of claim 19, the synchronization being generated based upon the determined timing offsets and the known timing points.

21. The computer program of claim 19, wherein each reference-CD slice is approximately five times longer than the corresponding one of the user-CD slices.

22. The computer program of claim 19, wherein each reference-CD slice is approximately five seconds long, and each user-CD slice is approximately one second long.

23. The computer program of claim 20, wherein generating the synchronization function includes generating an Nth-order polynomial equation, N+1 being the number of timing offsets and known timing points.

24. The computer program of claim 23, wherein N is based upon the playing time of the reference-CD track.

25. The computer program of claim 20, further comprising first identifying the user-CD track that comprises digital data representing the selected song from a plurality of tracks on the user CD.

26. The computer program of claim 25, wherein identifying the user-CD track includes:

generating user-CD key data indicative of the order and respective playing times of the plurality of music tracks on the user CD;

comparing the user-CD key data to reference-CD key data indicative of the order and respective playing times of the music tracks on the reference CD; and based upon the comparison, determining the music track on the user CD most likely to represent the selected song.

27. The computer program claim 26, wherein comparing the user-CD key data to the reference-CD key data includes comparing the number of music tracks on the user CD with the number of music tracks on the reference CD.

28. The computer program of claim 27, wherein identifying the user-CD track further includes discarding a portion of the user-CD key data indicative of excess music tracks if the number of music tracks on the user CD exceeds the number of music tracks on the reference CD, and then recomparing the remaining user-CD key data with the reference-CD key data.

29. The computer program of claim 27, wherein, if the number of music tracks on the user CD is less than the number of music tracks on the reference CD, identifying the user-CD track further includes providing an output that prompts a user to do at least one of:

provide input identifying the user-CD track; and replace the user CD in the CD-ROM drive with a different user CD.

30. The computer program of claim 27, wherein comparing the user-CD key data to the reference-CD key data further includes:

determining if a total-playing-time condition is met, the total-playing-time condition being met if a total of the playing times of the music tracks on the user CD is within a predetermined total-time difference of a total of the playing times of corresponding music tracks on the reference CD; and determining if a start-song condition is met, the start-song condition being met if start-song codes of each of the music tracks on the user CD are within a predetermined start-song time difference of start-song codes of corresponding music tracks on the reference CD, the start-song code of each music track on a CD being the accumulated playing times of all preceding music tracks on the CD.

31. The computer program of claim 30, wherein, if either of the total-playing-time condition and the start-song condition is not met, identifying the user music track further includes:

scaling the start-song code of each music track on the user CD by a factor equal to the total of the playing times of the music tracks on the reference CD divided by the total of the playing times of corresponding music tracks on the user CD; and determining if the start-song condition is met for the scaled start-song codes.

32. The computer program of claim 31, wherein, if the start-song condition is not met for the scaled start-song codes, identifying the user-CD track further includes providing an output that prompts a user to do at least one of:

provide input identifying the user-CD track; and replace the user CD in the CD-ROM drive with a different user CD.

33. The computer program of claim 17, wherein the user-CD key data is represented by a user-CD key-string comprising a concatenated string of equal-length character strings, each character string being representative of the playing time of a music track on the user CD, the order of the character strings in the user-CD key-string being indicative of the order of the music tracks on the user CD.

34. The computer program of claim 17, wherein the general purpose computer is configured with a sound card that digitizes an audio signal produced by the CD-ROM drive based on the user-CD track, the sound card including driver software to store the digitized audio signal in a memory and to deliver the stored digitized signal to a processor, and wherein the synchronization function is also characteristic of a digitizing delay indicative of an elapsed time for the sound card to deliver the stored digitized signal in response to the audio signal.

35. A computer program being stored on media readable by a general purpose computer configured with a CD-ROM drive, for configuring the computer upon being read and executed to perform functions comprising:

synchronizing music data being stored on media readable by the computer with a user-CD track on a user-CD compact disk (CD) inserted in the CD-ROM drive, wherein the user-CD track comprises digital data representing a selected song, the selected song also being represented by digital data on a reference-CD track on a reference CD, the music data being representative of notes based upon the reference-CD track, including:

generating user-CD data characteristic of start-song times of music tracks on the user CD;

comparing the user-CD data with reference-CD data characteristic of start-song times of music tracks on the reference-CD;

based upon the comparison, generating a synchronization function characteristic of timing differences between the start-song times on the reference-CD and the user-CD track; and adjusting the timing of the music data with the synchronization function.

36. The computer program of claim 35, wherein the user-CD data is further indicative of the order and respective playing times of music tracks on the user CD, and the reference-CD data is further indicative of the order and respective playing times of music tracks on the reference CD.

37. The computer program of claim 36, wherein comparing the user-CD data to the reference-CD data further includes:

determining if a total-playing-time condition is met, the total-playing-time condition being met if a total of the playing times of the music tracks on the user CD is within a predetermined total-time difference of a total of the playing times of corresponding music tracks on the reference CD; and determining if a start-song condition is met, the start-song condition being met if start-song times of each of the music tracks on the user CD are within a predetermined start-song time difference of start-song times of corresponding music tracks on the reference CD, the start-song time of each music track on a CD being the accumulated playing times of all preceding music tracks on the CD.

38. The computer program of claim 37, wherein generating a synchronization function includes determining a start-song shift by adding time differences between the start-song times of corresponding music tracks on the user CD and the reference CD up to the user-CD track, and adjusting includes shifting music data by the determined start-song shift.

39. The computer program of claim 35, wherein the general purpose computer is configured with a sound card that digitizes an audio signal produced by the CD-ROM drive based on the user-CD track, the sound card including driver software to store the digitized audio signal in a memory and to deliver the stored digitized signal to a processor, and wherein the synchronization function is also characteristic of a digitizing delay indicative of an elapsed time for the sound card to deliver the stored digitized signal in response to the audio signal.

40. A computer program being stored on media readable by a general purpose computer configured with a processor, a memory, a CD-ROM drive that produces an audio signal based on an audio track on a CD, and a sound card that digitizes the audio signal, the sound card including driver software to store the digitized audio signal in the memory and to deliver the stored digitized audio signal to the processor, the computer program for configuring the computer upon being read and executed to:

determine a digitizing delay indicative of an elapsed time for the sound card to deliver the stored signal in response to the audio signal; and storing the digitizing delay in the memory.

41. The computer program of claim 40, the program further configuring the computer to:

synchronize music data being stored on media readable by the computer with a user-CD track on a user-CD compact disk (CD) inserted in the CD-ROM drive based upon the stored digitizing delay, wherein the user-CD track comprises digital data representing a selected song, the selected song also being represented by digital data on a reference-CD track on a reference CD, the music data being representative of notes based upon the reference-CD track.

42. A method of synchronizing music data with signals input by a user in response to prompts associated with the music data, comprising:

determining a position of a peak in a distribution of timing differences between the signals input by the user and music data associated with the prompts; and shifting the timing of the music data if the peak position is nonzero.

43. The method of claim 42, wherein shifting includes shifting by a fraction of the peak position.

44. The method of claim 42, further including repeating the determining and shifting until the peak position is within a preset timing difference.

* * * * *